United States Patent
Zhai et al.

(10) Patent No.: US 9,684,446 B2
(45) Date of Patent: *Jun. 20, 2017

(54) TEXT SUGGESTION OUTPUT USING PAST INTERACTION DATA

(71) Applicant: Google Inc., Mountain View, CA (US)

(72) Inventors: Shumin Zhai, Los Altos, CA (US); Philip Quinn, Christchurch (NZ)

(73) Assignee: Google Inc., Mountain View, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/471,610

(22) Filed: Aug. 28, 2014

(65) Prior Publication Data

US 2014/0372931 A1 Dec. 18, 2014

Related U.S. Application Data

(63) Continuation of application No. 13/909,275, filed on Jun. 4, 2013, now Pat. No. 8,825,474.

(Continued)

(51) Int. Cl.
*G06F 17/21* (2006.01)
*G06F 3/0488* (2013.01)

(Continued)

(52) U.S. Cl.
CPC ........ *G06F 3/04886* (2013.01); *G06F 3/0237* (2013.01); *G06F 3/04883* (2013.01);

(Continued)

(58) Field of Classification Search
CPC .......... G06F 17/20; G06F 17/21; G06F 17/27; G06F 17/28; G06F 17/212;

(Continued)

(56) References Cited

U.S. PATENT DOCUMENTS 6,111,985 A * 8/2000 Hullender .......... G06K 9/00879
382/187
6,286,064 B1 9/2001 King et al.
(Continued)

FOREIGN PATENT DOCUMENTS

CN 102591472 A 7/2012
EP 1 923 796 A1 5/2008
(Continued)

OTHER PUBLICATIONS

Office Action from U.S. Appl. No. 14/144,991, dated Dec. 15, 2016, 32 pp.
(Continued)

*Primary Examiner* — Qi Han
(74) *Attorney, Agent, or Firm* — Shumaker & Sieffert, P.A.

(57) ABSTRACT

In one example, a device includes at least one processor and at least one module operable by the at least one processor to output, for display, a graphical user interface including a graphical keyboard and one or more text suggestion regions, and select, based at least in part on an indication of gesture input, at least one key of the graphical keyboard. The at least one module is further operable by the at least one processor to determine a plurality of candidate character strings, determine past interaction data that comprises a representation of a past user input corresponding to at least one candidate character string while the at least one candidate character string was previously displayed in at least one of the one or more text suggestion regions, and output the at least one candidate character string for display in one of the one or more text suggestion regions.

18 Claims, 5 Drawing Sheets

Related U.S. Application Data

(60) Provisional application No. 61/812,526, filed on Apr. 16, 2013.

(51) Int. Cl.
*G06F 3/023* (2006.01)
*G06F 17/27* (2006.01)

(52) U.S. Cl.
CPC ............ *G06F 17/27* (2013.01); *G06F 17/276* (2013.01); *G06F 17/277* (2013.01)

(58) Field of Classification Search
CPC ............. G06F 17/2705; G06F 17/2735; G06F 17/277; G06F 3/041; G06F 3/0416; G06F 3/048; G06F 3/0481; G06F 3/04812; G06F 3/0488; G06F 3/04883; G06F 3/04886; G06F 3/0489
USPC ...................................... 704/9, 10, 1, 3, 4, 7
See application file for complete search history.

(56) References Cited

U.S. PATENT DOCUMENTS

| | | |
|---|---|---|
| 6,292,179 B1 | 9/2001 | Lee |
| 6,801,190 B1 | 10/2004 | Robinson et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,453,439 B1 | 11/2008 | Kushler et al. |
| 7,508,324 B2 | 3/2009 | Suraqui |
| 7,706,616 B2 | 4/2010 | Kristensson et al. |
| 7,716,579 B2 | 5/2010 | Gunn et al. |
| 7,750,891 B2 | 7/2010 | Stephanick et al. |
| 7,921,361 B2 | 4/2011 | Gunn et al. |
| 8,036,878 B2 | 10/2011 | Assadollahi |
| 8,117,540 B2 | 2/2012 | Assadollahi |
| 8,135,582 B2 | 3/2012 | Suraqui |
| 8,825,474 B1 | 9/2014 | Zhai et al. |
| 2004/0183833 A1 | 9/2004 | Chua |
| 2005/0210402 A1 | 9/2005 | Gunn et al. |
| 2006/0119582 A1 | 6/2006 | Ng et al. |
| 2006/0176283 A1 | 8/2006 | Suraqui |
| 2007/0074131 A1 | 3/2007 | Assadollahi |
| 2008/0316183 A1 | 12/2008 | Westerman et al. |
| 2009/0077464 A1 | 3/2009 | Goldsmith et al. |
| 2009/0109067 A1 | 4/2009 | Burstrom |
| 2009/0187846 A1 | 7/2009 | Paasovaara |
| 2009/0192786 A1 | 7/2009 | Assadollahi |
| 2010/0036655 A1 | 2/2010 | Cecil et al. |
| 2010/0131447 A1 | 5/2010 | Creutz et al. |
| 2010/0265181 A1 | 10/2010 | Shore |
| 2012/0036469 A1 | 2/2012 | Suraqui |
| 2013/0021286 A1 | 1/2013 | Sudo |
| 2013/0046544 A1 | 2/2013 | Kay et al. |
| 2014/0063067 A1 | 3/2014 | Compton et al. |
| 2014/0267056 A1 | 9/2014 | Pasquero et al. |

FOREIGN PATENT DOCUMENTS

| | | |
|---|---|---|
| EP | 2 109 046 A1 | 10/2009 |
| JP | 2011221759 A | 11/2011 |
| JP | 2012248153 A | 12/2012 |

OTHER PUBLICATIONS

Amendment in Response to Office Action mailed Dec. 15, 2015, from U.S. Appl. No. 14/144,991, filed Feb. 18, 2016, 12 pp.
Final Office Action from U.S. Appl. No. 14/144,991, dated May 10, 2016, 33 pp.
Response to the Final Office Action mailed May 10, 2016, from U.S. Appl. No. 14/144,991, filed Jun. 27, 2016, 13 pp.
Advisory Action from U.S. Appl. No. 14/144,991, dated Jul. 14, 2016, 3 pp.
First Office Action, and translation thereof, from counterpart Chinese Application No. 201480021906.X, dated May 24, 2016, 15 pp.
"Using the Word Prediction in Accent," retrieved from http://www.prentrom.com/support/article/1726, accessed on Oct. 24, 2012, 10 pp.
"Setting the Selection Area in Word Prediction," retrieved from http://talknow.prentrom.com/support/articles?id=1365, accessed on Oct. 24, 2012, 2 pp.
"Adjusting the Settings for Word Prediction," retrieved from http://talknow.prentrom.com/support/articles?id=1342, accessed on Oct. 24, 2012, 10 pp.
Lomas, "Hey Apple, What the Next iPhone Really, Really Needs Is a Much Better Keyboard," retrieved from techcrunch.com/2013/04/21/the-iphone-keyboard-stinks/?, accessed on Apr. 22, 2013, 6 pp.
U.S. Appl. No. 60/430,338, by Daniel Suraqui, filed Nov. 29, 2002.
U.S. Appl. No. 60/505,724, by Daniel Suraqui, filed Sep. 22, 2003.
U.S. Appl. No. 14/144,991, by Zhai et al., filed Dec. 31, 2013.
International Search Report and Written Opinion from International Application No. PCT/US2014/033318, dated Aug. 1, 2014, 9 pp.
International Preliminary Report on Patentability from counterpart International Application No. PCT/US2014/033458, mailed Oct. 29, 2015, 8 pp.
Non-Final Office Action from U.S. Appl. No. 14/144,991, mailed Sep. 22, 2016 34 pgs.
Response to Non-Final Office Action from U.S. Appl. No. 14/144,991, mailed Sep. 22, 2016, filed Dec. 20, 2016.
Prosecution History from U.S. Appl. No. 13/909,275, filed Jun. 4, 2013, from Aug. 29, 2013 through Apr. 25, 2014 96 pgs.
Notification of the Second Office Action from counterpart Chinese Application No. 201480021906.X, issued Dec. 5, 2016 15 pgs.
Notice of Allowance from U.S. Appl. No. 14/144,991, mailed Apr. 11, 2017 13 pgs.

* cited by examiner

TEXT SUGGESTION OUTPUT USING PAST INTERACTION DATA

This application is a continuation of U.S. application Ser. No. 13/909,275, filed Jun. 4, 2013, which claims the benefit of U.S. Provisional Application No. 61/812,526, filed Apr. 16, 2013, the entire contents of which are incorporated herein in its entirety.

BACKGROUND

Some computing devices (e.g., mobile phones, tablet computers) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document). For instance, a display device of a computing device may output a graphical (or "soft") keyboard that enables the user to enter data by selecting (e.g., by tapping) one or more keys of the graphical keyboard.

Some computing devices may determine one or more candidate character strings (e.g., candidate words included in a lexicon, such as a dictionary) based on data entered using the graphical keyboard. In some examples, a computing device may output one or more of the candidate character strings for display within one or more text suggestion regions that enable the user to select a character string by indicating (e.g., tapping) the text suggestion region that includes a desired character string. In certain examples, the computing device may select one or more of the candidate character strings for display within the one or more text suggestion regions based on a probability that the candidate character string represents a word included in a lexicon (e.g., a dictionary, such as an English language dictionary).

However, such techniques may have certain drawbacks. For example, such techniques may present a user with candidate character strings that, although associated with words included in a lexicon, are unlikely to be selected by the user. Accordingly, such techniques may not present the user with those text suggestions that are most likely to be selected (e.g., for auto-completion), thereby reducing the likelihood that the user will utilize the text suggestion interface and potentially reducing the speed at which the user is able to interact with the computing device to enter text.

SUMMARY

In one example, a method includes outputting, by a computing device and for display, a graphical user interface including a graphical keyboard and one or more text suggestion regions, receiving, by the computing device, an indication of gesture input detected a presence-sensitive input device, and selecting, by the computing device and based at least in part on the indication of the gesture input, at least one key of the graphical keyboard. The method further includes determining, by the computing device, past interaction data that comprises a representation of a past user input corresponding to at least one candidate character string of the plurality of candidate character strings while the at least one candidate character string was previously displayed in at least one of the one or more text suggestion regions, and outputting, by the computing device and based at least in part on the past interaction data, the at least one candidate character string for display in one of the one or more text suggestion regions.

In one example, a device includes at least one processor, and at least one module operable by the at least one processor to output, for display, a graphical user interface including a graphical keyboard and one or more text suggestion regions, receive an indication of gesture input detected a presence-sensitive input device, and select, based at least in part on the indication of the gesture input, at least one key of the graphical keyboard. The at least one module is further operable by the at least one processor to determine, based at least in part on at least one character associated with the at least one key, a plurality of candidate character strings, determine past interaction data that comprises a representation of a past user input corresponding to at least one candidate character string of the plurality of candidate character strings while the at least one candidate character string was previously displayed in at least one of the one or more text suggestion regions, and output, based at least in part on the past interaction data, the at least one candidate character string for display in one of the one or more text suggestion regions.

In a computer-readable storage medium is encoded with instructions that, when executed, cause at least one processor of a computing device to output, for display, a graphical user interface including a graphical keyboard and one or more text suggestion regions, receive an indication of gesture input detected a presence-sensitive input device, and select, based at least in part on the indication of the gesture input, at least one key of the graphical keyboard. The computer-readable storage medium is further encoded with instructions that, when executed, cause the at least one processor of the computing device to determine, based at least in part on at least one character associated with the at least one key, a plurality of candidate character strings, determine past interaction data that comprises a representation of a past user input corresponding to at least one candidate character string of the plurality of candidate character strings while the at least one candidate character string was previously displayed in at least one of the one or more text suggestion regions, and output, based at least in part on the past interaction data, the at least one candidate character string for display in one of the one or more text suggestion regions.

The details of one or more examples of the disclosure are set forth in the accompanying drawings and the description below. Other features, objects, and advantages will be apparent from the description and drawings, and from the claims.

DETAILED DESCRIPTION

Figure 1:
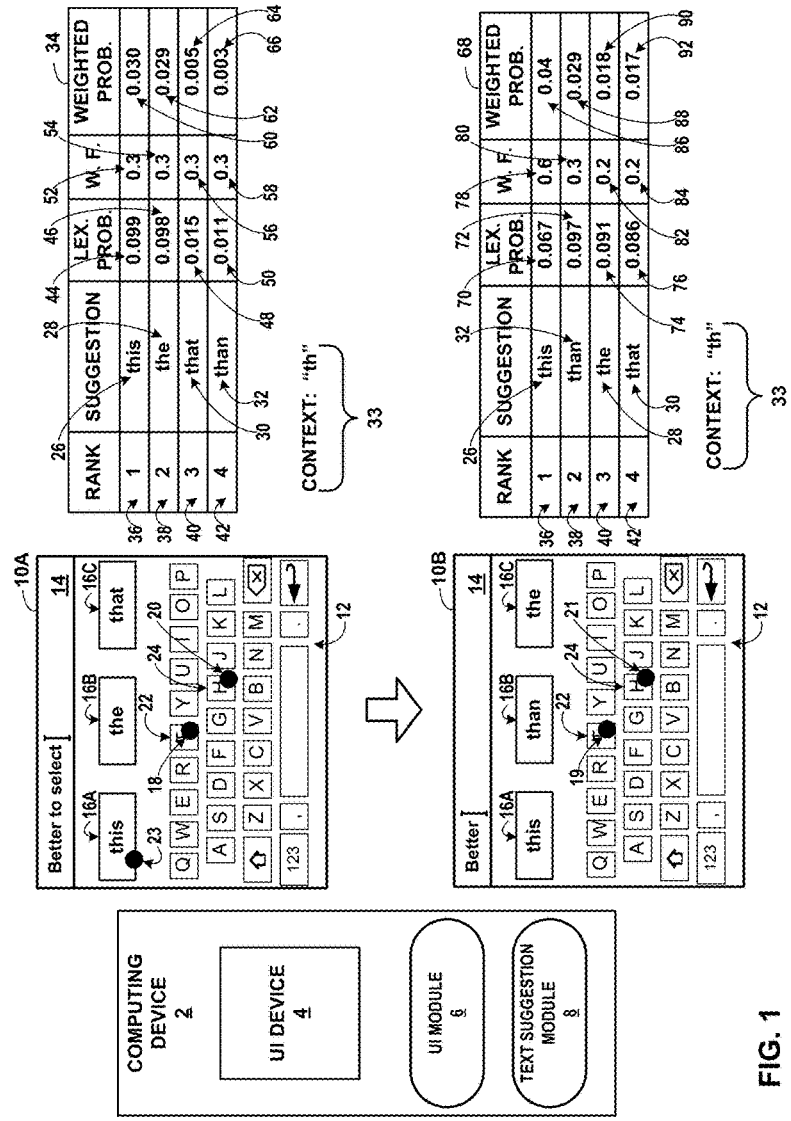
FIG. 1 is a block diagram illustrating an example computing device that may be used to output at least one candidate character string for display in a text suggestion region of a graphical user interface, in accordance with one or more aspects of this disclosure.

In general, this disclosure is directed to techniques for outputting at least one candidate character string for display within one or more text suggestion regions of a display based at least in part on past user interaction data. The past interaction data can comprise a representation of a prior user input corresponding to the at least one candidate character string at a previous time when the at least one candidate character string was displayed within at least one of the one or more text suggestion regions of a display. For example, a computing device may output for display (e.g., at a display device, such as a presence-sensitive display), a graphical user interface including a graphical keyboard and one or more text suggestion regions (e.g., one, two, three, five, or more text suggestion regions). In response to receiving an indication of user input detected at a presence-sensitive input device (e.g., a presence-sensitive display), the computing device may select at least one key of the graphical keyboard. The computing device may determine a plurality of candidate character strings (e.g., candidate words included in a lexicon, such as a dictionary) based at least in part on at least one character associated with the at least one key. These techniques may improve the ease with which a user may enter text using the displayed text suggestion regions.

Rather than outputting one or more candidate character strings for display within text suggestion regions (e.g., for auto-completion) based only on a lexical probability of each of the candidate character strings (e.g., a probability that a candidate character string represents a word included in the lexicon), a computing device implementing techniques of this disclosure may output one or more candidate character strings for display within one or more of the text suggestion regions based at least in part on past interaction data. The past interaction data may include one or more of a representation of a past user input to select a candidate character string while the candidate character string was previously displayed within a text suggestion region of a display, a prior lack of user input to select a candidate character string while the candidate character string was previously displayed within a text suggestion region (e.g., in an instance in which a user continued to provide gesture input to select keys of the graphical keyboard while the candidate character string was displayed within a text suggestion region), and a past user input to reject a candidate character string while the candidate character string was previously displayed within a text suggestion region (e.g., to select a different candidate character string displayed within a different text suggestion region).

The computing device may apply at least one lexical probability weighting factor to a lexical probability of a candidate character string based at least in part on the representation of the past user decision (e.g., a past user input and/or decision of a user not to provide a user input). For instance, the computing device may increase the lexical probability of a candidate character string based at least in part on a past user decision to select the candidate character string while the candidate character string was previously displayed within a text suggestion region. As another example, the computing device may decrease the lexical probability of a candidate character string based at least in part on a past user decision to ignore the candidate character string while the candidate character string was previously displayed within a text suggestion region. As yet another example, the computing device may decrease the lexical probability of a candidate character string based at least in part on a past user decision to reject the candidate character string (e.g., select a different candidate character string) while the candidate character string was previously displayed within a text suggestion region. In certain examples, the computing device may decrease the lexical probability of a candidate character string by a first value based at least in part on a past user decision to ignore the candidate character string, and may decrease the lexical probability of the candidate character string by a second value, of greater magnitude than the first value, based at least in part on a past user decision to reject the candidate character string.

The computing device may output one or more candidate character strings for display within one or more text suggestion regions based at least in part on the weighted lexical probabilities of the plurality of candidate character strings, such as by determining a ranked ordering of the plurality of candidate character strings based on the weighted lexical probabilities. In this way, a computing device implementing techniques of this disclosure may output, for display within text suggestion regions, those candidate character strings that may potentially be most likely to be selected by the user (e.g., for auto-completion). Accordingly, the techniques may increase the likelihood that a user may utilize the text suggestion interface, thereby potentially increasing the rate at which the user may enter text using the computing device.

FIG. 1 is a block diagram illustrating an example computing device 2 that may be used to output at least one candidate character string for display in a text suggestion region of a graphical user interface, in accordance with one or more aspects of this disclosure. In some examples, computing device 2 may be associated with a user that may interact with computing device 2 by providing various user inputs to the computing device. Examples of computing device 2 may include, but are not limited to, portable or mobile devices such as mobile phones (including smartphones), laptop computers, desktop computers, tablet computers, smart television platforms, personal digital assistants (PDA's), servers, mainframes, and the like. Computing device 2, in some examples, may include user interface (UI) device 4, UI module 6, and text suggestion module 8. Other examples of computing device 2 that implement techniques of this disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive screen, mouse, keyboard, voice responsive system, microphone, camera or other device for receiving input. For example, UI device 4 may include a presence-sensitive input device and/or display that may detect the presence of an input unit (e.g., a finger, pen, stylus, and the like) performing one or more gestures. UI device 4 may output for display content such as graphical user interfaces (GUI's) 10A-10B (collectively referred to herein as "GUI's 10"). GUI's 10 may include text display region 14, graphical keyboard 12, text suggestion regions 16A-16C (collectively referred to herein as "text suggestion regions 16"), or other display regions.

As shown in FIG. 1, computing device 2 may include UI module 6. UI module 6 may perform one or more functions to receive input, such as user input, and send indications of such input to other components associated with computing device 2, such as text suggestion module 8. UI module 6 may also receive data from components associated with computing device 2, such as text suggestion module 8. Using the data, UI module 6 may cause components associated with computing device 2, such as UI device 4, to provide output based on the data. For instance, UI module 6 may receive data from text suggestion module 8, and may cause UI device 4 to display GUI's 10 based on such data, such as by causing UI device 4 to display one or more candidate character strings in one or more of text display regions 16 in accordance with techniques described herein. In some examples, UI module 6 may include functionality associated with one or more applications executable by computing device 2, such as one or more of a word-processing application, text messaging application, spreadsheet, web browser, server application, or other application. In certain examples, UI module 6 may be implemented as an application executable by one or more processors of computing device 2, such as a downloadable or pre-installed application or "app." In some examples, UI module 6 may be implemented as part of a hardware unit of computing device 2. As another example, UI module 6 may be implemented as part of an operating system of computing device 2.

As shown in FIG. 1, GUI's 10 may each be an interface generated by UI module 6 to enable a user to interact with computing device 2. GUI's 10 may each include graphical content. Graphical content, generally, may be any visually displayable graphical object of a graphical user interface. Examples of graphical content may include text, images, a group of moving images, hyperlink, animation, video, characters of a character set, and the like. As shown in FIG. 1, graphical content may include graphical keyboard 12, text display region 14, text suggestion regions 16, as well as one or more candidate character strings displayed in text suggestion regions 16.

Graphical keyboard 12 may include a plurality of keys, such as "T" key 22 and "H" key 24. In some examples, each of the plurality of keys included in graphical keyboard 12 represents a single character. In other examples, one or more of the plurality of keys included in graphical keyboard 12 represents a group of characters selected based on a plurality of modes. Graphical keyboard 12 may be displayed by UI device 4 as an ordered set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 12 includes a version of the traditional "QWERTY" keyboard layout for the English language providing character keys as well as various keys (e.g., the "123" key) providing other functionality.

In some examples, text display region 14 may include characters or other graphical content that are included in, for example, a text message, a document, an e-mail message, a web browser, and the like. For instance, text display region 14 may include characters or other graphical content that are selected by a user via gestures performed at UI device 4. In some examples, text suggestion regions 16 may each display a candidate character string, such as a candidate word included in a lexicon (e.g., the English language). As illustrated in the example of FIG. 1, text suggestion regions 16 may be different regions of GUI's 10 than text display region 14. In other examples, text suggestion regions 16 may be a single region of GUI's 10, and may include one or more regions of GUI's 10 that are the same as text display region 14. Similarly, while illustrated as separate regions in the example of FIG. 1, text suggestion regions 16, in some examples, may be a single region of GUI's 10.

UI module 6 may cause UI device 4 to display graphical keyboard 12 and detect gesture input, such as gesture input detected at one or more locations of UI device 4 that display one or more keys of graphical keyboard 12, and one or more locations of UI device 4 that display text suggestion regions 16. Additionally, text suggestion module 8 may determine one or more candidate character strings based at least in part on one or more characters associated with selected keys of graphical keyboard 12. Text suggestion module 8 may cause UI device 4 to display one or more of the candidate character strings in one or more of text suggestion regions 16, in accordance with techniques described herein.

According to techniques of the present disclosure, computing device 2 may improve the ease with which a user may enter text (e.g., within text display region 14) using text suggestion regions (e.g., text suggestion regions 16) by outputting one or more candidate character strings for display in text suggestion regions based at least in part on past interaction data that includes a representation of a past user decision corresponding to a candidate character string while the candidate character string was previously displayed in at least one of the one or more text suggestion regions. For example, using techniques of this disclosure, a computing device may determine a weighted lexical probability of at least one of a plurality of candidate character strings. The computing device may determine the weighted lexical probability based at least in part on past interaction data including a representation of a user decision, such as a representation of a user decision to select a candidate character string while it was previously displayed within a text suggestion region, a user decision to ignore a candidate character string while it was previously displayed within a text suggestion region, or a user decision to reject a candidate character string while it was previously displayed within a text suggestion region. As such, techniques described herein may enable a computing device to output candidate character strings for display within one or more text suggestion regions that may be more likely to be selected, such as for auto-completion. In this way, the techniques may increase the rate at which a user may interact with a computing device to enter text, thereby potentially increasing usability of the computing device.

As illustrated in FIG. 1, UI device 4 may output GUI's 10 including graphical keyboard 12 for display at UI device 4. UI device 4 (e.g., a presence-sensitive and/or touch-sensitive input device and/or display) may receive an indication of gesture input detected at locations 18 and 20 of graphical keyboard 12. In response to receiving the indication of gesture input detected at location 18 (e.g., an indication of a touch input detected at location 18), UI module 6 may select "T" key 22 as a first selected key of graphical keyboard 12, such as by determining that location 18 corresponds to a location of graphical keyboard 12 that displays "T" key 22. Similarly, in response to receiving the indication of gesture input detected at location 20 (e.g., an indication of a touch input detected at location 20), UI module 6 may select "H" key 24 as a second selected key of graphical keyboard 12, such as by determining that location 20 corresponds to a location of graphical keyboard 12 that displays "H" key 24. While illustrated in FIG. 1 with respect to multiple gesture inputs detected at locations 18 and 20 to select "T" key 22 and "H" key 24, aspects of this disclosure are not so limited. For instance, in some examples, such as when graphical keyboard 12 includes functionality of a gesture keyboard, UI module 6 may select "T" key 22 and "H" key 24 in response to receiving an indication of a single continuous gesture input detected from location 18 to location 20 such that UI device 4 detects the presence of an input unit (e.g., a finger, pen, stylus, and the like) from location 18 to location 20 of graphical keyboard 12.

Continuing with the above example, text suggestion module 8 may determine a plurality of candidate character strings in response to selecting "T" key 22 and "H" key 24 as selected keys of graphical keyboard 12. Each respective candidate character string may include a group of predicted characters that includes characters associated with the selected keys. For instance, in the example of FIG. 1, text suggestion module 8 may determine a plurality of candidate character strings for which the characters "T" and "H", corresponding to "T" key 22 and "H" key 24 respectively, are a prefix. As illustrated in FIG. 1, text suggestion module 8 may determine the plurality of candidate character strings including character string 26 (i.e., the character string including the plurality of characters "this"), character string 28 (i.e., the character string including the plurality of characters "the"), character string 30 (i.e., the character string including the plurality of characters "that"), and character string 32 (i.e., the character string character string including the plurality of characters "than"). While illustrated with respect to four candidate character strings 26, 28, 30, and 32, text suggestion module 8 may determine other numbers of candidate character strings, such as one candidate character string, two candidate character strings, five candidate character strings, fifty candidate character strings, or other numbers of candidate character strings.

Text suggestion module 8 may determine a ranked ordering of the plurality of candidate character strings. As illustrated in FIG. 1, text suggestion module 8 may determine ranked ordering 34 of the plurality of candidate character strings 26, 28, 30, and 32. Text suggestion module 8 may determine ranked ordering 34 based at least in part on past interaction data that includes a representation of a past user decision corresponding to at least one candidate character string from the plurality of candidate character strings while the at least one candidate character string was previously displayed in at least one of the one or more text suggestion regions. For example, text suggestion module 8 may determine ranked ordering 34 based at least in part on a weighted lexical probability of at least one candidate character string from the plurality of candidate character strings. Text suggestion module 8 may determine the weighted lexical probability associated with the candidate character string based at least in part on past interaction data including a representation of a past user decision corresponding to the candidate character string.

As an example, as illustrated in FIG. 1, text suggestion module 8 may determine lexical probability 44 corresponding to character string 26, lexical probability 46 corresponding to character string 28, lexical probability 48 corresponding to character string 30, and lexical probability 50 corresponding to character string 32. Text suggestion module 8 may determine the lexical probabilities (e.g., lexical probabilities 44, 46, 48, and 50), such as by comparing each respective candidate character string from the plurality of candidate character strings with a language model to determine a probability of each respective candidate character string, such as a probability that each respective candidate character string represents a word included in a lexicon (e.g., the English language) or a probability that each respective candidate character string represents a next word of a multi-word phrase. For instance, text suggestion module 8 may determine lexical probabilities 44, 46, 48, and 50 based at least in part on a probability that each of candidate character strings 26, 28, 30, and 32, respectively, represents a next word of the multi-word phrase "Better to select," as illustrated in text suggestion region 14 of GUI 10A.

As further illustrated in FIG. 1, text suggestion module 8 may determine lexical probability weighting factor 52 associated with character string 26, lexical probability weighting factor 54 associated with character string 28, lexical probability weighting factor 56 associated with character string 30, and lexical probability weighting factor 58 associated with character string 32. Text suggestion module 8 may determine lexical probability weighting factors 52, 54, 56, and 58 based at least in part on past interaction data including a representation of a past user decision corresponding to character strings 26, 28, 30, and 32.

For example, in response to receiving an indication of gesture input to select a character string while the character string is displayed within a text suggestion region (e.g., one or more of text suggestion regions 16), text suggestion module 8 may increase a lexical probability weighting factor associated with the character string. As another example, in response to receiving an indication of gesture input to select one or more keys of graphical keyboard 12 while a character string is displayed within a text suggestion region (i.e., an indication to ignore the character string, such as by continuing to provide gesture input to select keys of graphical keyboard 12), text suggestion module 8 may decrease a lexical probability weighting factor associated with the candidate character string. As another example, in response to receiving an indication of gesture input to select a text suggestion region that is different than a text suggestion region within which a candidate character string is displayed (i.e., an indication to reject the candidate character string), text suggestion module 8 may decrease a weighting factor associated with the candidate character string.

In some examples, text suggestion module 8 may decrease a lexical probability weighting factor associated with a candidate character string by a first value in response to receiving an indication of gesture input to ignore the candidate character string while the candidate character string is displayed within a text suggestion region, and may decrease the lexical probability weighting factor associated with the candidate character string by a second, different value in response to receiving an indication of gesture input to reject the candidate character string while the candidate character string is displayed within a text suggestion region. For instance, past interaction data that comprises a representation of a past user input (e.g., a past user decision) may indicate a lack or absence of input related to the particular candidate character string. A magnitude of the second value (e.g., the value by which text suggestion module 8 decreases the lexical probability weighting factor in response to receiving an indication to reject the candidate character string) may be greater than a magnitude of the first value (e.g., the value by which text suggestion module 8 decreases the lexical probability weighting factor in response to receiving an indication to ignore the candidate character string).

For instance, text suggestion module 8 may decrease the lexical probability weighting factor in response to a user decision to reject the candidate character string by a factor of one, two, three, etc. as compared with a decrease of the lexical probability weighting factor in response to a user decision to ignore the candidate character string. As one non-limiting example, text suggestion module 8 may, in response to a user decision to reject a candidate character string, decrease a lexical probability weighting factor associated with the candidate character string by a value such as five percent. Following with this example, in response to a user decision to ignore the candidate character string, text suggestion module 8 may decrease the lexical probability weighting factor associated with the candidate character string by a smaller value, such as one percent. Accordingly, text suggestion module 8 may determine one or more lexical probability weighting factors, each of the lexical probability weighting factors associated with a candidate character string, which include a representation of a past user decision corresponding to the respective candidate character string while the respective candidate character string was previously displayed in one or more text suggestion regions.

As illustrated in FIG. 1, text suggestion module 8 may determine weighted lexical probability 60 associated with character string 26, weighted lexical probability 62 associated with character string 28, weighted lexical probability 64 associated with character string 30, and weighted lexical probability 66 associated with character string 32. Text suggestion module 8 may apply a lexical probability weighting factor associated with a candidate character string to a lexical probability associated with the candidate character string to determine the weighted lexical probability associated with the candidate character string, such as by multiplying the lexical probability by the lexical probability weighting factor to determine the weighted lexical probability. For instance, text suggestion module 8 may apply lexical probability weighting factor 52 to lexical probability 44 to determine weighted lexical probability 60, such as by multiplying lexical probability 44 by lexical probability weighting factor 52 to determine weighted lexical probability 60. Similarly, text suggestion module 8 may apply lexical probability weighting factor 54 to lexical probability 46 to determine weighted lexical probability 62, apply lexical probability weighting factor 56 to lexical probability 48 to determine weighted lexical probability 64, and apply lexical probability weighting factor 58 to lexical probability 50 to determine weighted lexical probability 66.

As illustrated, text suggestion module 8 may associate each of the plurality of candidate character strings with a respective rank, such that ranked ordering 34 represents an ordered arrangement of the plurality of candidate character strings according to the weighted lexical probability of each respective candidate character string. For instance, in the example of FIG. 1, ranked ordering 34 includes first rank 36, second rank 38, third rank 40, and fourth rank 42. In this example, ranks 36, 38, 40, and 42 each correspond to a weighted lexical probability that an associated candidate character string represents a next word of a multi-word phrase included in text display region 14. In addition, in the example of FIG. 1, ranks 36, 38, 40, and 42 are arranged in descending order of probability, such that rank 36 is associated with a candidate character string corresponding to a highest relative weighted lexical probability that the candidate character string represents a next word of the multi-word phrase included in text display region 14, and rank 42 is associated with a candidate character string corresponding to a lowest relative weighted lexical probability that the candidate character string represents a next word of the multi-word phrase included in text display region 14.

In other examples, text suggestion module 8 may determine ranked ordering 34 such that ranks 36, 38, 40, and 42 are arranged in ascending order of probability. Similarly, in some examples, such as when the plurality of candidate character strings includes more than four candidate character strings or fewer than four candidate character strings, text suggestion module 8 may determine ranked ordering 34 as including more than four ranks or fewer than four ranks. In certain examples, text suggestion module 8 may determine ranked ordering 34 as including a number of ranks equal to the number of candidate character strings included in the plurality of candidate character strings, such that each of the plurality of candidate character strings is associated with a rank within ranked ordering 34. In some examples, a rank of candidate character strings included within a ranked ordering (e.g., ranked ordering 34) may be implicit in the ordering of the candidate character strings included within the list of candidate character strings, and actual ranking values need not necessarily be stored in associated with candidate character strings.

In addition, text suggestion module 8 may associate each of text suggestion regions 16A-16C with a respective rank corresponding to a probability of a candidate character string that is displayed within the respective one of text suggestion regions 16. In this way, text suggestion module 8 may determine a ranked ordering of text suggestion regions 16, such that each of text suggestion regions 16 is associated with a rank corresponding to a respective rank of an associated candidate character string (e.g., a rank stored in a data structure associated with the candidate character strings, an ordering or cardinality of the plurality of candidate character strings that corresponds with an ordering or cardinality of the rankings of text suggestion regions 16). For instance, in the example of FIG. 1, text suggestion module 8 determines a ranked ordering of text suggestion regions 16 such that text suggestion region 16A corresponds to a highest probability candidate character string, text suggestion region 16B corresponds to a second-highest probability candidate character string, and text suggestion region 16C corresponds to a third-highest probability candidate character string. In other examples, text suggestion module 8 may determine different ranked orderings of text suggestion regions 16, such as a ranked ordering that associates text suggestion region 16B with a highest probability candidate character string. In general, text suggestion module 8 may determine any ranked ordering of text suggestion regions 16, such that each respective one of text suggestion regions 16 corresponds to a different rank that associates the respective one of text suggestion regions 16 with a respective rank within the plurality of candidate character strings.

Text suggestion module 8 may cause UI device 4 to output one or more of the plurality of candidate character strings 26, 28, 30, and 32 for display at GUI 10A within text suggestion regions 16 in accordance with ranked ordering 34. For example, as illustrated in FIG. 1, text suggestion module 8 may cause UI device 4 to output candidate character strings 26, 28, and 30 for display within text suggestion regions 16 in accordance with ranked ordering 34. That is, in this example, text suggestion module 8 may determine that candidate character string 26 is associated with rank 36 (i.e., a highest rank of ranked ordering 34) that matches a rank associated with text suggestion region 16A (i.e., a highest rank of the ranked ordering of text suggestion regions 16). In response, text suggestion module 8 may cause UI device 4 to output candidate character string 26 for display within text suggestion region 16A. Similarly, text suggestion module 8 may determine that candidate character string 28 is associated with rank 38 (i.e., a second-highest rank of ranked ordering 34) that matches a rank associated with text suggestion region 16B (i.e., a second-highest rank of the ranked ordering of text suggestion regions 16), and may cause UI device 4 to output candidate character string 28 for display within text suggestion region 16B. Finally, text suggestion module 8 may determine that candidate character string 30 is associated with rank 40 (i.e., a third-highest rank of ranked ordering 34) that matches a rank associated with text suggestion region 16C (i.e., a third-highest rank of the ranked ordering of text suggestion regions 16), and may cause UI device 4 to output candidate character string 30 for display within text suggestion region 16C. In this way, text suggestion module 8 may cause UI device 4 to output one or more of candidate character strings 26, 28, 30, and 32 (i.e., one or more of the plurality of candidate character strings including candidate character strings 26, 28, and 30) for display within text suggestion regions 16 in accordance with ranked ordering 34.

UI module 6 may receive an indication of gesture input detected at a location of UI device 4 to select a candidate character string displayed in one of text suggestion regions 16. For example, UI module 6 may receive an indication of gesture input detected at location 23 of GUI 10A. In response, UI module 6 may select candidate character string 26 (i.e., the candidate character string displayed within text suggestion region 16A), such as by determining that location 23 corresponds to a location of UI device 4 that displays text suggestion region 16A. UI module 6 may cause UI device 4 to output candidate character string 26 (i.e., the candidate character string including the characters "this") for display within text display region 14. In this way, computing device 2 may enable a user of computing device 2 to select (e.g., auto-complete) a character string for display within text display region 14 without requiring the user to provide gesture input to select keys of graphical keyboard 12 associated with each of the characters included in the character string.

In addition, as UI module 6 receives indications of gesture input to select one or more keys of graphical keyboard 12 (e.g., indications of gesture input detected at locations 18 and 20 of graphical keyboard 12), text suggestion module 8 may determine a context of the gesture input responsive to which text suggestion module 8 determines the plurality of candidate character strings. As illustrated in FIG. 1, context 33 may include a representation of character "T" corresponding to the selected "T" key 22 and a representation of character "H" corresponding to the selected "H" key 24 (e.g., character string "th" in this example). As another example, the context of the gesture input may include a representation of one or more the keys of graphical keyboard 12, such as "T" key 22 and "H" key 24. As another example, the context of the gesture input may include a representation of location 18 and a representation of location 20 of graphical keyboard 12, such as a centroid of a group of pixels corresponding to a touch point of location 18 of UI device 4 (e.g., a presence-sensitive and/or touch-sensitive device, such as a presence-sensitive and/or touch-sensitive screen) and a centroid of a group of pixels of corresponding to a touch point of location 20 of UI device 4. As yet another example, the context of the gesture input may include a representation of a relative location of GUI 10A corresponding to location 18 of graphical keyboard 12 and a relative location of GUI 10A corresponding to location 20 of graphical keyboard 12, such as an X-Y coordinate pair of each of a locations 18 and 20 as determined from a predefined reference point of GUI 10A, such as an upper-left corner of GUI 10A.

In some examples, the context may include previous and/or subsequent words and/or characters relative to one or more selected characters. In certain examples, the context may include information such as a type and/or version of an application used to input characters, a type of input field used to input characters (e.g., text input field, password field, date field, or other types of fields), a time of day at which computing device 2 receives the indication of the gesture input, a geographical location of computing device 2 while computing device 2 receives the indication of the gesture input, and the like. In general, text suggestion module 8 may determine the context of the gesture input as any characteristic of the gesture input that identifies, characterizes, and/or accompanies the gesture input responsive to which text suggestion module 8 determines the plurality of candidate character strings. In some examples, the context may uniquely identify the gesture input.

In certain examples, text suggestion module 8 continuously determines the context of the gesture input as UI module 6 receives indications of gesture input to select one or more keys of graphical keyboard 12. In some examples, text suggestion module 8 initiates and/or restarts the determination of the context of the gesture input in response to receiving gesture input to select a next word or sentence, such as gesture input to select a delimiter key (e.g., a space key, a punctuation key, or other delimiter key) of graphical keyboard 12.

In some examples, text suggestion module 8 generates a data structure that associates a candidate character string with a lexical probability weighting factor (e.g., a past interaction data structure). In certain examples, text suggestion module 8 generates the data structure as associating a candidate character string, a lexical probability weighting factor, and a context of gesture input responsive to which text suggestion module 8 determined the candidate character string. For instance, in the example of FIG. 1, text suggestion module 8 may determine context 33 of candidate character string 26 as the character string "th" (i.e., a character string including characters associated with "T" key 22 and "H" key 24). In response to receiving the indication of gesture input detected at location 23 of GUI 10A to select candidate character string 26 displayed within text suggestion region 16A, text suggestion module 8 may generate and/or maintain a data structure that associates the character string "th" (e.g., context 33 in this example) with candidate character string 26 (i.e., the character string "this") and lexical weighting factor 52.

Text suggestion module 8 may similarly maintain the data structure to reflect a past user decision corresponding to at least one candidate character string while the at least one candidate character string was previously displayed within the at least one of the one or more text suggestion regions. For example, as in the example of FIG. 1, text suggestion module 8 may maintain the data structure to reflect a user decision to select character string 26 while character string 26 is displayed within one of text suggestion regions 16 by at least increasing lexical probability weighting factor 52 associated with character string 26, as is further described below. As another example, text suggestion module 8 may maintain the data structure to reflect a user decision to reject character strings 28 and 30 (e.g., to select a different character string displayed within a different text suggestion region, such as character string 26 displayed within text suggestion region 16A in this example) by at least decreasing lexical probability weighting factor 54 associated with character string 28 and decreasing lexical probability weighting factor 56 associated with character string 30. In other examples, such as when UI module 6 receives an indication to select a key of graphical keyboard 12 while one or more of the plurality of candidate character strings is displayed in one or more text suggestion regions (e.g., an indication that a user is continuing to provide gesture input to select keys of the graphical keyboard, such as to continue to type characters of a word or phrase), text suggestion module 8 may maintain the data structure to reflect a user decision to ignore the one or more of the plurality of candidate character strings by at least decreasing one or more lexical probability weighting factors associated with the one or more of the plurality of candidate character strings. In this way, text suggestion module 8 may generate and/or maintain a data structure that associates each of multiple candidate character strings (e.g., tens, hundreds, thousands, or other numbers of candidate character strings) with an associated lexical probability weighting factor and/or a context of gesture input responsive to which text suggestion module 8 determined the candidate character string.

According to techniques described herein, text suggestion module 8 may traverse the data structure as UI module 6 receives subsequent gesture input to select one or more keys of graphical keyboard 12 and determine a plurality of candidate character strings based at least in part on the received gesture input. Text suggestion module 8 may determine a ranked ordering of the plurality of candidate character strings based at least in part on past interaction data that includes a representation of a past user decision corresponding to at least one candidate character string from the plurality of candidate character strings while the at least one candidate character string was previously displayed within at least one of the one or more text suggestion regions. Accordingly, text suggestion module 8 may cause UI device 4 to output those candidate character strings that are more likely to be selected while displayed in one or more of the text suggestion regions (e.g., for auto-completion).

For example, as illustrated in FIG. 1, UI module 6 may cause UI device 4 to output GUI 10B for display (e.g., at a presence-sensitive display). In the example of FIG. 1, GUI 10B represents an example of GUI's 10 output by UI module 6 for display subsequent to receiving the indication of gesture input detected at location 23 and selecting candidate character string 26 for display within text display region 14. That is, in the example of FIG. 1, GUI's 10A and 10B, when taken together, illustrate an example where computing device 2 outputs GUI 10A and receives an indication of gesture input to select candidate character string 26 displayed in text suggestion region 16A at a first time, then subsequently outputs GUI 10B at a second, different time (e.g., during a subsequent power-cycle of computing device 2, during a separate instance of a particular application executing on one or more processors of computing device 2, during an instance of a separate application executing on one or more processors of computing device 2).

As illustrated in FIG. 1, UI module 6 may cause UI device 4 to output GUI 10B including graphical keyboard 12, text display region 14, and text suggestion regions 16. As illustrated by like numerals, graphical keyboard 12, text display region 14, and text suggestion regions 16 of GUI 10B may be substantially similar to graphical keyboard 12, text display region 14, and text suggestion regions 16 of GUI 10A. As illustrated, UI module 6 may receive an indication of gesture input detected at locations 19 and 21 of graphical keyboard 12. In response to receiving the indication of gesture input detected at location 19, UI module 6 may select "T" key 22 as a first selected key of graphical keyboard 12. Similarly, in response to receiving the indication of gesture input detected at location 21, UI module 6 may select "H" key 24 as a second selected key of graphical keyboard 12.

In response to selecting "T" key 22 and "H" key 24 as selected keys of graphical keyboard 12, text suggestion module 8 may determine a plurality of candidate character strings for which the character string "th" is a prefix. For instance, as was similarly described with respect to the example of GUI 10A, text suggestion module 8 may determine the plurality of candidate character strings including candidate character strings 26, 28, 30, and 32.

Text suggestion module 8 may determine ranked ordering 68 of the plurality of candidate character strings 26, 28, 30, and 32. For example, text suggestion module 8 may compare each of candidate character strings 26, 28, 30, and 32 to a language model, such as an n-gram language model, to determine a lexical probability associated with each of candidate character strings 26, 28, 30, and 32. In this example, each respective lexical probability may indicate a probability that each respective candidate character string follows the character string "Better" displayed within text display region 14. As illustrated, text suggestion module 8 may determine lexical probability 70 associated with candidate character string 26, lexical probability 72 associated with candidate character string 32, lexical probability 74 associated with candidate character string 28, and lexical probability 76 associated with candidate character string 30.

As illustrated in the example of FIG. 1, text suggestion module 8 determines that candidate character string 32 (i.e., the candidate character string "than") is associated with a highest relative lexical probability (e.g., a highest lexical probability within the plurality of candidate character strings 26, 28, 30, and 32) that the candidate character string represents the next word of a multi-word phrase displayed within text display region 14. That is, in this example, text suggestion module 8 determines that the multi-word phrase "Better than" is associated with a higher lexical probability than each of the multi-word phrases "Better this," "Better the," and "Better that" corresponding to candidate character strings 26, 28, and 30, respectively. Similarly, in this example, text suggestion module 8 determines that candidate character string 26 (i.e., the candidate character string "this") is associated with a lowest relative lexical probability within the plurality of candidate character strings 26, 28, 30, and 32.

Text suggestion module 8 may determine ranked ordering 68 based at least in part on past interaction data that includes a representation of a past user decision corresponding to at least one candidate character string from the plurality of candidate character strings while the at least one candidate character string was previously displayed in at least one of the one or more text suggestion regions. For example, text suggestion module 8 may determine lexical probability weighting factor 78 associated with candidate character string 26, lexical probability weighting factor 80 associated with candidate character string 32, lexical probability weighting factor 82 associated with candidate character string 28, and lexical probability weighting factor 84 associated with candidate character string 30.

Text suggestion module 8 may apply each respective lexical probability weighting factor to the lexical probability associated with the respective candidate character string to determine a plurality of weighted lexical probabilities associated with the plurality of candidate character strings. For instance, as illustrated in FIG. 1, text suggestion module 8 may apply lexical probability weighting factor 78 to lexical probability 70 to determine weighted lexical probability 86 associated with candidate character string 26 (e.g., by multiplying lexical probability 70 by lexical probability weighting factor 78 to determine weighted lexical probability 86). Similarly, text suggestion module 8 may apply lexical probability weighting factor 80 to lexical probability 72 to determine weighted lexical probability 88 associated with candidate character string 32, apply lexical weighting factor 82 to lexical probability 74 to determine weighted lexical probability 90 associated with candidate character string 28, and apply lexical probability weighting factor 84 to lexical probability 76 to determine weighted lexical probability 92 associated with candidate character string 30.

Text suggestion module 8 may determine ranked ordering 68 of the plurality of candidate character strings 26, 28, 30, and 32 based at least in part on the respective weighted lexical probabilities associated with each of candidate character strings 26, 28, 30, and 32. For instance, as in the example of FIG. 1, text suggestion module 8 may determine that candidate character string 26 is associated with a highest relative weighted lexical probability within the plurality of weighted lexical probabilities (i.e., weighted lexical probability 86 in this example). Accordingly, text suggestion module 8 may associate candidate character string 26 with rank 36 corresponding to a highest rank within ranked ordering 68. Similarly, text suggestion module 8 may associate candidate character string 32 with rank 38 corresponding to a second-highest rank within ranked ordering 68, candidate character string 28 with rank 40 corresponding to a third-highest rank within ranked ordering 68, and candidate character string 30 with rank 42 corresponding to a fourth-highest rank within ranked ordering 68. In this way, text suggestion module 8 may determine ranked ordering 68 based at least in part on past interaction data that includes a representation of a past user decision corresponding to at least one candidate character string from the plurality of candidate character strings while the at least one candidate character string was previously displayed within at least one of the one or more text suggestion regions. For instance, as illustrated with respect to the example of GUI 10A of FIG. 1, text suggestion module 8 may determine ranked ordering 68 based at least in part on past interaction data that includes a representation of a past user decision to select candidate character string 26 (e.g., the candidate character string "this") while candidate character string 26 was previously displayed within text suggestion region 16A.

As such, text suggestion module 8 may output, for display within one or more text suggestion regions, candidate character strings according to a ranked ordering that reflects past user decisions to select, ignore, and reject one or more of the candidate character strings while the one or more candidate character strings were previously displayed within one or more of the text suggestion regions. Accordingly, text suggestion module 8 may increase the likelihood that candidate character strings output for display within the text suggestion regions will be selected (e.g., for auto-completion), thereby potentially increasing the likelihood that the text suggestion regions will be utilized to increase the rate at which text may be entered using computing device 2.

Figure 2:
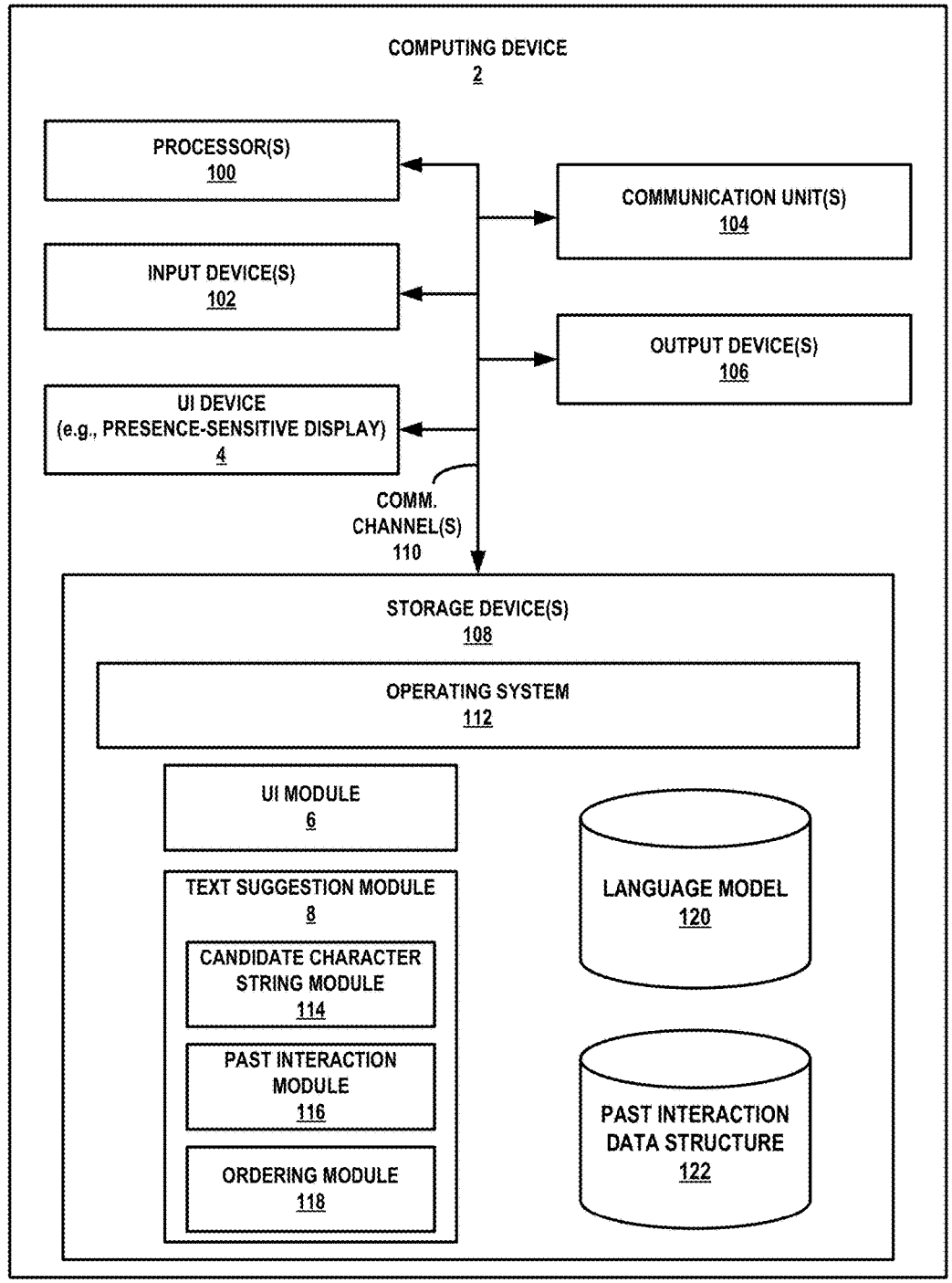
FIG. 2 is a block diagram illustrating further details of one example of the computing device shown in FIG. 1, in accordance with one or more aspects of this disclosure.

FIG. 2 is a block diagram illustrating further details of one example of the computing device shown in FIG. 1, in accordance with one or more aspects of this disclosure. FIG. 2 illustrates only one particular example of computing device 2, and many other examples of computing device 2 may be used in other instances.

As shown in the specific example of FIG. 2, computing device 2 includes one or more processors 100, one or more input devices 102, UI device 4, one or more communication units 104, one or more output devices 106, and one or more storage devices 108. As illustrated, computing device 2 may further include UI module 6, text suggestion module 8, and operating system 112 that are executable by computing device 2 (e.g., by one or more processors 100). Similarly, as illustrated, text suggestion module 8 may include candidate character string module 114, past interaction module 116, and ordering module 118 that are executable by computing device 2. Computing device 2, in one example, further includes language model 120 and past interaction data structure 122.

Each of components 4, 100, 102, 104, 106, and 108 may be interconnected (physically, communicatively, and/or operatively) for inter-component communications. In some examples, communication channels 110 may include a system bus, a network connection, an inter-process communication data structure, or any other method for communicating data. As one example in FIG. 2, components 4, 100, 102, 104, 106, and 108 may be coupled by one or more communication channels 110. UI module 6, text suggestion module 8, candidate character string module 114, past interaction module 116, and ordering module 118 may also communicate information with one another as well as with other components of computing device 2, such as language model 120 and past interaction data structure 122.

Processors 100, in one example, are configured to implement functionality and/or process instructions for execution within computing device 2. For example, processors 100 may be capable of processing instructions stored in storage device 108. Examples of processors 100 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 108 may be configured to store information within computing device 2 during operation. Storage device 108, in some examples, is described as a computer-readable storage medium. In some examples, storage device 108 is a temporary memory, meaning that a primary purpose of storage device 108 is not long-term storage. Storage device 108, in some examples, is described as a volatile memory, meaning that storage device 108 does not maintain stored contents when the computer is turned off. Examples of volatile memories include random access memories (RAM), dynamic random access memories (DRAM), static random access memories (SRAM), and other forms of volatile memories known in the art. In some examples, storage device 108 is used to store program instructions for execution by processors 100. Storage device 108, in one example, is used by software or applications running on computing device 2 (e.g., text suggestion module 8) to temporarily store information during program execution.

Storage devices 108, in some examples, also include one or more computer-readable storage media. Storage devices 108 may be configured to store larger amounts of information than volatile memory. Storage devices 108 may further be configured for long-term storage of information. In some examples, storage devices 108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 104. Computing device 2, in one example, utilizes communication unit 104 to communicate with external devices via one or more networks, such as one or more wireless networks. Communication unit 104 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 104 to wirelessly communicate with an external device such as a server.

Computing device 2, in one example, also includes one or more input devices 102. Input device 102, in some examples, is configured to receive input from a user through tactile, audio, or video feedback. Examples of input device 102 include a presence-sensitive input device and/or display, a mouse, a keyboard, a voice responsive system, video camera, microphone or any other type of device for detecting a command from a user. In some examples, a presence-sensitive input device and/or display includes a touch-sensitive screen.

One or more output devices 106 may also be included in computing device 2. Output device 106, in some examples, is configured to provide output to a user using tactile, audio, or video stimuli. Output device 106, in one example, includes a presence-sensitive display, a sound card, a video graphics adapter card, or any other type of device for converting a signal into an appropriate form understandable to humans or machines. Additional examples of output device 106 include a speaker, a cathode ray tube (CRT) monitor, a liquid crystal display (LCD), or any other type of device that can generate intelligible output to a user.

In some examples, UI device 4 may include functionality of input device 102 and/or output device 106. In one example, UI device 4 may be a touch-sensitive screen. In the example of FIG. 2, UI device 4 may be a presence-sensitive display. In some examples, a presence sensitive display may detect an object, such as an input unit (e.g., user's finger, pen, stylus, etc.) at and/or near the screen of the presence-sensitive display. As one example range, a presence-sensitive display may detect an input unit that is within 2 inches or less of the physical screen of the presence-sensitive display. The presence-sensitive display may determine one or more locations (e.g., (x,y) coordinates) of the presence-sensitive display at which the input unit was detected. In another example range, a presence-sensitive display may detect an object six inches or less from the physical screen of the presence-sensitive display and other exemplary ranges are also possible. The presence-sensitive display may determine the location of the display selected by an input unit using capacitive, inductive, and/or optical recognition techniques. In some examples, the presence sensitive display provides output to a user using tactile, audio, or video stimuli as described with respect to output device 106.

Computing device 2 may include operating system 112. Operating system 112, in some examples, controls the operation of components of computing device 2. For example, operating system 112, in one example, facilitates the communication of UI module 6, text suggestion module 8, candidate character string module 114, past interaction module 116, and/or ordering module 118 with processors 100, communication unit 104, storage device 108, input device 102, and output device 106. UI module 6, text suggestion module 8, candidate character string module 114, past interaction module 166, and ordering module 118 may each include program instructions and/or data that are executable by computing device 2. As one example, text suggestion module 8 may include instructions that cause computing device 2 to perform one or more of the operations and actions described in the present disclosure.

Storage devices 108 may include language model 120. Language model 120 may include a lexicon. In some examples, a lexicon may include a listing of words and may include additional information about the listed words. A lexicon may be represented by one or more data structures, such as by one or more of an array, a list, a tree, or other data structures. For example, language model 120 may include a lexicon stored in a trie data structure. In some examples, language model 120 may be a default dictionary installed on computing device 2. In certain examples, language model 120 may include a group of predefined phrases installed on computing device 2. In other examples, language model 120 may include multiple sources of lexicons, which may be stored at computing device 2 or stored at one or more remote computing devices that are accessible to computing device 2 via one or more communication channels. In some examples, language model 120 may be implemented in the firmware of computing device 2.

Language model 120 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "i" follows the sequence of letters "th". As another example, a bigram language model may provide a probability that the word "this" follows the word "better." In some examples, language model 120 includes a lexicon trie with integrated language model frequency information. For instance, each node of the lexicon trie may include a representation of a letter and a probability value.

Computing device 2 may include past interaction data structure 122 that associates a candidate character string with a representation of a past user decision corresponding to the candidate character string while the candidate character string was previously displayed within at least one text suggestion region. In certain examples, past interaction data structure 122 associates a context of a candidate character string responsive to which computing device 2 determined the candidate character string with the candidate character string and the representation of the past user decision corresponding to the candidate character string. Examples of past interaction data structure 122 may include, but are not limited to, an array, a table, a list, a tree, a hash table, or other data structures capable of associating a candidate character string with a representation of a past user decision corresponding to the candidate character string while the candidate character string was previously displayed in at least one text suggestion region and/or a context of gesture input responsive to which computing device determined the candidate character string. In some examples, past interaction data structure 122 and language model 120 may be represented as a single data structure.

Techniques of the present disclosure may potentially improve the speed with which a user can enter text into a computing device. Using techniques of this disclosure, a computing device may output, based at least in part on past interaction data that includes a representation of a past user decision corresponding to at least one candidate character while the at least one candidate character string was previously displayed in at least one text suggestion region, the at least one candidate character string for display within a text suggestion region. As such, according to techniques described herein, the computing device may increase the likelihood that a candidate character string will be selected while the candidate character string is displayed within a text suggestion region, thereby possibly increasing the rate at which a user may enter text using the computing device.

UI module 6 may output, for display (e.g., at a display device such as UI device 4), a graphical user interface including a graphical keyboard and one or more text suggestion regions. For instance, UI module 6 may output GUI 10A including graphical keyboard 12 and text suggestion regions 16 for display at UI device 4 (e.g., a presence-sensitive and/or touch-sensitive input device). UI module 6 may receive an indication of gesture input detected a presence-sensitive input device. For example, UI module 6 may receive an indication of gesture input detected at locations 18 and 20 of UI device 4.

UI module 6 may select, based at least in part on the indication of the gesture input, at least one key of the graphical keyboard. As an example, UI module 6 may select "T" key 22 based at least in part on the indication of gesture input detected at location 18 of UI device 4. Similarly, UI module 6 may select "H" key 24 based at least in part on the indication of gesture input detected at location 20 of UI device 4. Candidate character string module 114 may determine, based at least in part on at least one character associated with the at least one key, a plurality of candidate character strings. For example, candidate character string module 114 may determine the plurality of candidate character strings including candidate character string 26 (e.g., the character string "this"), candidate character string 28 (e.g., the character string "the"), candidate character string 30 (e.g., the character string "that"), and candidate character string 32 (e.g., the character string "than"). Candidate character string module 114 may determine the plurality of candidate character strings based at least in part on at least one character associated with the at least one key, such as by determining a plurality of candidate character strings for which a character string including characters associated with the at least one key are a prefix.

Past interaction module 116 may determine past interaction data that includes a representation of a past user decision corresponding to at least one candidate character string from the plurality of candidate character strings while the at least one candidate character string was previously displayed in at least one of the one or more text suggestion regions. For example, past interaction module 116 may access (e.g., traverse) past interaction data structure 122 to determine a lexical probability weighting factor associated with at least one candidate character string from the plurality of candidate character strings. The lexical probability weighting factor may reflect one or more of a past user decision to select the at least one candidate character string while the at least one candidate character string was previously displayed in one of the one or more text suggestion regions, a past user decision to ignore the at least one candidate character string while the at least one candidate character string was previously displayed within one of the one or more text suggestion regions (e.g., when a user continues to provide gesture input to select keys of graphical keyboard 12 while the at least one candidate character string was previously displayed within a text suggestion region), and a past user decision to reject the at least one candidate character string while the at least one candidate character string was previously displayed within one of the one or more text suggestion regions (e.g., when a user selects a different candidate character string displayed within a different text suggestion region while the at least one candidate character string was previously displayed within a text suggestion region).

In some examples, in response to receiving gesture input to select a candidate character string displayed within one of the one or more text suggestion regions and/or to select one or more keys of graphical keyboard 12 while at least one candidate character string is displayed within one of the one or more text suggestion regions, past interaction data module 116 may maintain past interaction data structure 122 to reflect a user decision with respect to the at least one candidate character string. As one example, in response to receiving an indication of gesture input to select a candidate character string while the candidate character string is displayed in a text suggestion region, past interaction module 116 may maintain past interaction data structure 122 by at least increasing a lexical probability weighting factor associated with the candidate character string. As another example, in response to receiving an indication of gesture input to select at least one key of graphical keyboard 12 while a candidate character string is displayed within a text suggestion region (e.g., a user decision to ignore the candidate character string), past interaction module 116 may maintain past interaction data structure 122 by at least decreasing a lexical probability weighting factor associated with the candidate character string. As another example, in response to receiving an indication of gesture input to select a first candidate character string displayed within a first text suggestion region, past interaction module 116 may maintain past interaction data structure 122 by at least decreasing a lexical probability weighting factor associated with a second, different candidate character string displayed within a second, different text suggestion region while the first candidate character string is selected while being displayed within the first text suggestion region.

Ordering module 118 may output, based at least in part on the determining the past interaction data, the at least one candidate character string for display within one of the one or more text suggestion regions. For example, ordering module 118 may access language model 120 to determine a lexical probability associated with each of the plurality of candidate character strings. Ordering module 118 may access past interaction data structure 122 to determine a lexical probability weighting factor associated with each of the plurality of candidate character strings. Ordering module 118 may apply a lexical probability weighting factor associated with at least one of the candidate character strings to a lexical probability associated with the at least one of the candidate character strings to determine at least one weighted lexical probability associated with the at least one of the candidate character strings.

Ordering module 118 may determine a ranked ordering of the plurality of candidate character strings based at least in part on the weighted lexical probabilities of the plurality of candidate character strings. For example, ordering module 118 may determine ranked ordering 68 based at least in part on weighted lexical probabilities 86, 88, 90, and 92 associated with candidate character strings 26, 32, 28, and 30, respectively. Ordering module 118 may output one or more of the candidate character strings for display within one or more of text suggestion regions based at least in part on the ranked ordering. For instance, ordering module 118 may output one or more of the plurality of candidate character strings for display within one or more of the text suggestion regions based on a determination, by ordering module 118, that a rank of a candidate character string within the ranked ordering of the candidate character strings matches a rank of a text suggestion region within a ranked ordering of the text suggestion regions.

In this way, rather than output a candidate character string for display within one or more text suggestion regions based only on a probability that the candidate character string represents a word included in a lexicon, computing device 2 may output the candidate character string for display within one or more text suggestion regions based at least in part on past interaction data corresponding to a past user decision with respect to the candidate character string while the candidate character string was previously displayed within a text suggestion region. As such, according to techniques of the present disclosure, computing device 2 may increase the likelihood that a candidate character string output for display within a text suggestion region will be selected while being displayed within the text suggestion region (e.g., for auto-completion), thereby possibly increasing the rate at which a user may enter text using computing device 2.

Figure 3:
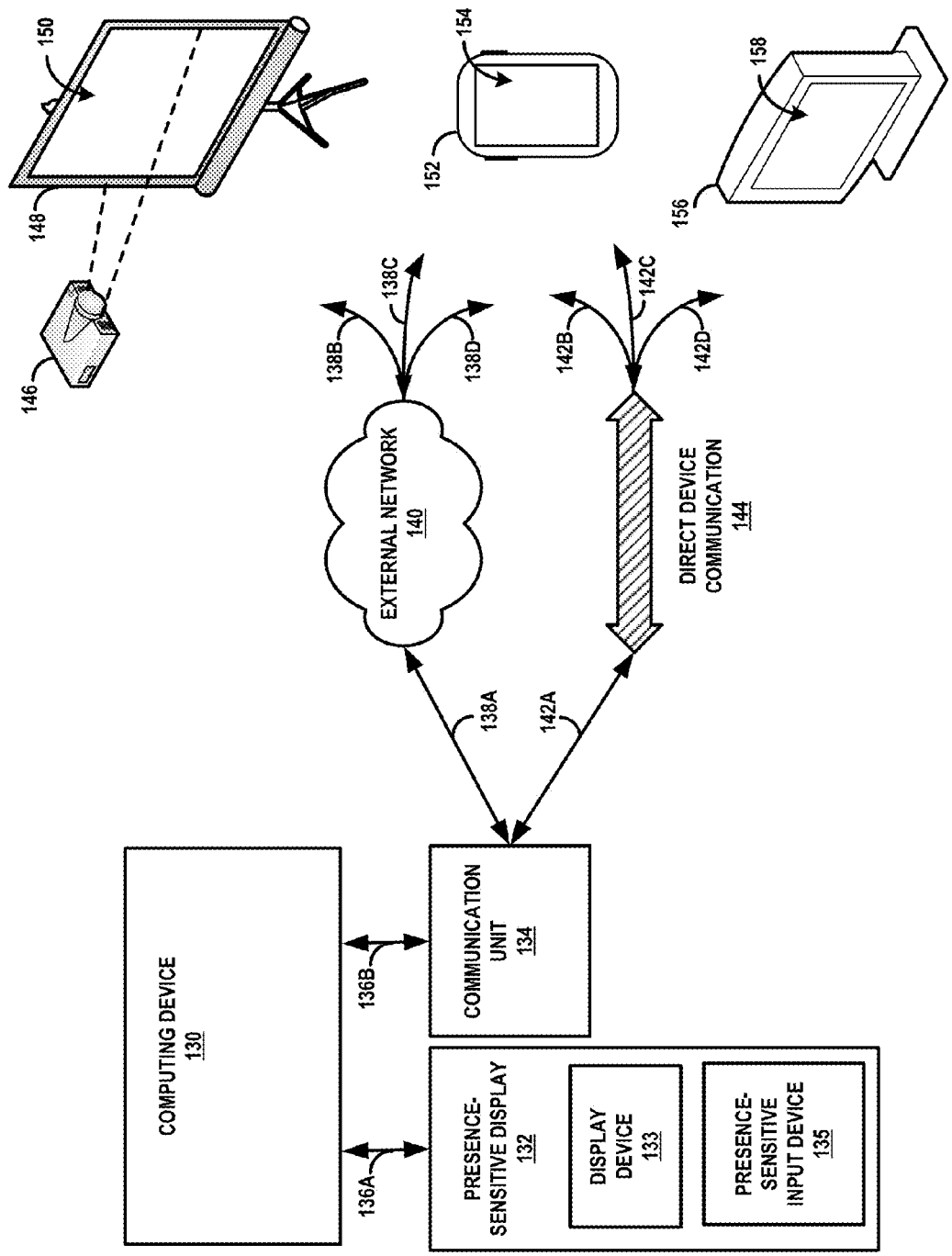
FIG. 3 is a block diagram illustrating an example computing device that outputs graphical content for display at a remote device, in accordance with one or more aspects of this disclosure.

FIG. 3 is a block diagram illustrating an example computing device that outputs graphical content for display at a remote device, in accordance with one or more aspects of this disclosure. Graphical content, generally, may include any visual information that may be output for display, such as text, images, a group of moving images, etc. The example shown in FIG. 3 includes a computing device 130, presence-sensitive display 132, communication unit 134, projector 146, projector screen 148, tablet device 152, and visual display device 156. Although shown for purposes of example in FIGS. 1 and 2 as a stand-alone computing device 2, a computing device may, generally, be any component or system that includes a processor or other suitable computing environment for executing software instructions and, for example, need not include a presence-sensitive display.

As shown in the example of FIG. 3, computing device 130 may be a processor that includes functionality as described with respect to processor 100 in FIG. 2. In such examples, computing device 130 may be operatively coupled to presence-sensitive display 132 by a communication channel 136A, which may be a system bus or other suitable connection. Computing device 130 may also be operatively coupled to communication unit 134, further described below, by a communication channel 136B, which may also be a system bus or other suitable connection. Although shown separately as an example in FIG. 3, computing device 130 may be operatively coupled to presence-sensitive display 132 and I/O devices 134 by any number of one or more communication channels.

In other examples, such as illustrated previously in FIGS. 1-2, computing device 130 may refer to a portable or mobile device such as mobile phones (including smart phones), laptop computers, and the like. In some examples, computing device 130 may be a desktop computers, tablet computers, smart television platforms, cameras, personal digital assistants (PDAs), servers, mainframes, and the like.

Presence-sensitive display 132, like UI device 4 as shown in FIG. 1, may include display device 133 and presence-sensitive input device 135. Display device 133 may, for example, receive data from computing device 130 and display the graphical content. In some examples, presence-sensitive input device 135 may determine one or more user inputs (e.g., continuous gestures, multi-touch gestures, single-touch gestures) at presence-sensitive display 132 using capacitive, inductive, and/or optical recognition techniques and send indications of such user input to computing device 130 using communication channel 136A. In some examples, presence-sensitive input device 135 may be physically positioned on top of display device 133 such that, when a user positions an input unit over a graphical element displayed by display device 133, the location at which presence-sensitive input device 135 corresponds to the location of display device 133 at which the graphical element is displayed.

As shown in FIG. 3, computing device 130 may also include and/or be operatively coupled with communication unit 134. Communication unit 134 may include functionality of communication unit 104 as described in FIG. 2. Examples of communication unit 134 may include a network interface card, an Ethernet card, an optical transceiver, a radio frequency transceiver, or any other type of device that can send and receive information. Other examples of such communication units may include Bluetooth, 3G, and WiFi radios, and Universal Serial Bus (USB) interfaces. Computing device 130 may also include and/or be operatively coupled with one or more other devices, e.g., input devices, output devices, memory, storage devices, etc. that are not shown in FIG. 3 for purposes of brevity and illustration.

FIG. 3 also illustrates a projector 146 and projector screen 148. Other such examples of projection devices may include electronic whiteboards, holographic display devices, and any other suitable devices for displaying graphical content. Projector 146 and project screen 148 may include one or more communication units that enable the respective devices to communicate with computing device 130. In some examples, the one or more communication units may enable communication between projector 146 and projector screen 148. Projector 146 may receive data from computing device 130 that includes graphical content. Projector 146, in response to receiving the data, may project the graphical content onto projector screen 148. In some examples, projector 146 may determine one or more user inputs (e.g., continuous gestures, multi-touch gestures, single-touch gestures) at projector screen using optical recognition or other suitable techniques and send indications of such user input using one or more communication units to computing device 130.

Projector screen 148, in some examples, may include a presence-sensitive display 150. Presence-sensitive display 150 may include a subset of functionality or all of the functionality of UI device 4 as described in this disclosure. In some examples, presence-sensitive display 150 may include additional functionality. Projector screen 148 (e.g., an electronic whiteboard), may receive data from computing device 130 and display the graphical content. In some examples, presence-sensitive display 150 may determine one or more user inputs (e.g., continuous gestures, multi-touch gestures, single-touch gestures) at projector screen 148 using capacitive, inductive, and/or optical recognition techniques and send indications of such user input using one or more communication units to computing device 130.

FIG. 3 also illustrates tablet device 152 and visual display device 156. Tablet device 152 and visual display device 156 may each include computing and connectivity capabilities. Examples of tablet device 152 may include e-reader devices, convertible notebook devices, and hybrid slate devices. Examples of visual display device 156 may include televisions and computer monitors. As shown in FIG. 3, tablet device 152 may include a presence-sensitive display 154. Visual display device 156 may include a presence-sensitive display 158. Presence-sensitive displays 154, 158 may include a subset of functionality or all of the functionality of UI device 4 as described in this disclosure. In some examples, presence-sensitive displays 154, 158 may include additional functionality. In any case, presence-sensitive display 158, for example, may receive data from computing device 130 and display the graphical content. In some examples, presence-sensitive display 158 may determine one or more user inputs (e.g., continuous gestures, multi-touch gestures, single-touch gestures) at projector screen using capacitive, inductive, and/or optical recognition techniques and send indications of such user input using one or more communication units to computing device 130.

As described above, in some examples, computing device 130 may output graphical content for display at presence-sensitive display 132 that is coupled to computing device 130 by a system bus or other suitable communication channel. Computing device 130 may also output graphical content for display at one or more remote devices, such as projector 146, projector screen 148, tablet device 152, and visual display device 156. For instance, computing device 130 may execute one or more instructions to generate and/or modify graphical content in accordance with techniques of the present disclosure. Computing device 130 may output the data that includes the graphical content to a communication unit of computing device 130, such as communication unit 134. Communication unit 134 may send the data to one or more of the remote devices, such as projector 146, projector screen 148, tablet device 152, and/or visual display device 156. In this way, processor 152 may output the graphical content for display at one or more of the remote devices. In some examples, one or more of the remote devices may output the graphical content at a presence-sensitive display that is included in and/or operatively coupled to the respective remote devices.

In some examples, computing device 130 may not output graphical content at presence-sensitive display 132 that is operatively coupled to computing device 130. In other examples, computing device 130 may output graphical content for display at both a presence-sensitive display 132 that is coupled to computing device 130 by communication channel 136A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 130 and output for display at presence-sensitive display 132 may be different than graphical content display output for display at one or more remote devices.

Computing device 130 may send and receive data using any suitable communication techniques. For example, computing device 130 may be operatively coupled to external network 140 using network link 138A. Each of the remote devices illustrated in FIG. 3 may be operatively coupled to network external network 140 by one of respective network links 138B, 138C, and 138D. External network 140 may include network hubs, network switches, network routers, etc., that are operatively inter-coupled thereby providing for the exchange of information between computing device 130 and the remote devices illustrated in FIG. 3. In some examples, network links 138A-138D may be Ethernet, ATM or other network connections. Such connections may be wireless and/or wired connections.

In some examples, computing device 130 may be operatively coupled to one or more of the remote devices included in FIG. 3 using direct device communication 144. Direct device communication 144 may include communications through which computing device 130 sends and receives data directly with a remote device, using wired or wireless communication. That is, in some examples of direct device communication 144, data sent by computing device 130 may not be forwarded by one or more additional devices before being received at the remote device, and vice-versa. Examples of direct device communication 144 may include Bluetooth, Near-Field Communication (NFC), Universal Serial Bus (USB), WiFi, infrared, etc. One or more of the remote devices illustrated in FIG. 3 may be operatively coupled with computing device 130 by communication links 142A-142D. In some examples, communication links 138A-138D may be connections using Bluetooth, Near-Field Communication, Universal Serial Bus, infrared, etc. Such connections may be wireless and/or wired connections.

In accordance with techniques of the disclosure, computing device 130 may be operatively coupled to visual display device 156 using external network 140. Computing device 130 may output a graphical user interface including, for example, a graphical keyboard and one or more text suggestion regions for display at presence-sensitive display 158. For instance, computing device 130 may send data that includes a representation of the graphical user interface to communication unit 134. Communication unit 134 may send the data that includes the representation of the graphical user interface to visual display device 156 using external network 140. Visual display device 156, in response to receiving the data using external network 140, may cause presence-sensitive display 158 to output the graphical user interface. In response to a user performing a gesture at presence-sensitive display 158 to select one or more keys of the keyboard, visual display device 156 may send an indication of the gesture input to computing device 130 using external network 140. Communication unit 134 may receive the indication of the gesture, and send the indication to computing device 130.

Computing device 130 may determine, based at least in part on the indication of the gesture input, a plurality of candidate character strings. In some examples, computing device 130 may determine past interaction data that includes a representation of a past user decision corresponding to at least one candidate character string from the plurality of candidate character strings while the at least one candidate character string was previously displayed in at least one of the one or more text suggestion regions. Computing device 130 may output, based at least in part on the determining the past interaction data, the at least one candidate character string for display within one of the one or more text suggestion regions. For instance, computing device 130 may send data that includes the at least one candidate character string to communication unit 134, which in turn sends the data to visual display device 156 using external network 140. Upon receiving the data, visual display device 156 may cause presence-sensitive display 158 to display the at least one candidate character string within one of the one or more text suggestion regions of the graphical user interface. In this way, processor 152 may output the candidate character string for display at presence-sensitive screen 158, in accordance with techniques of this disclosure.

Figure 4:
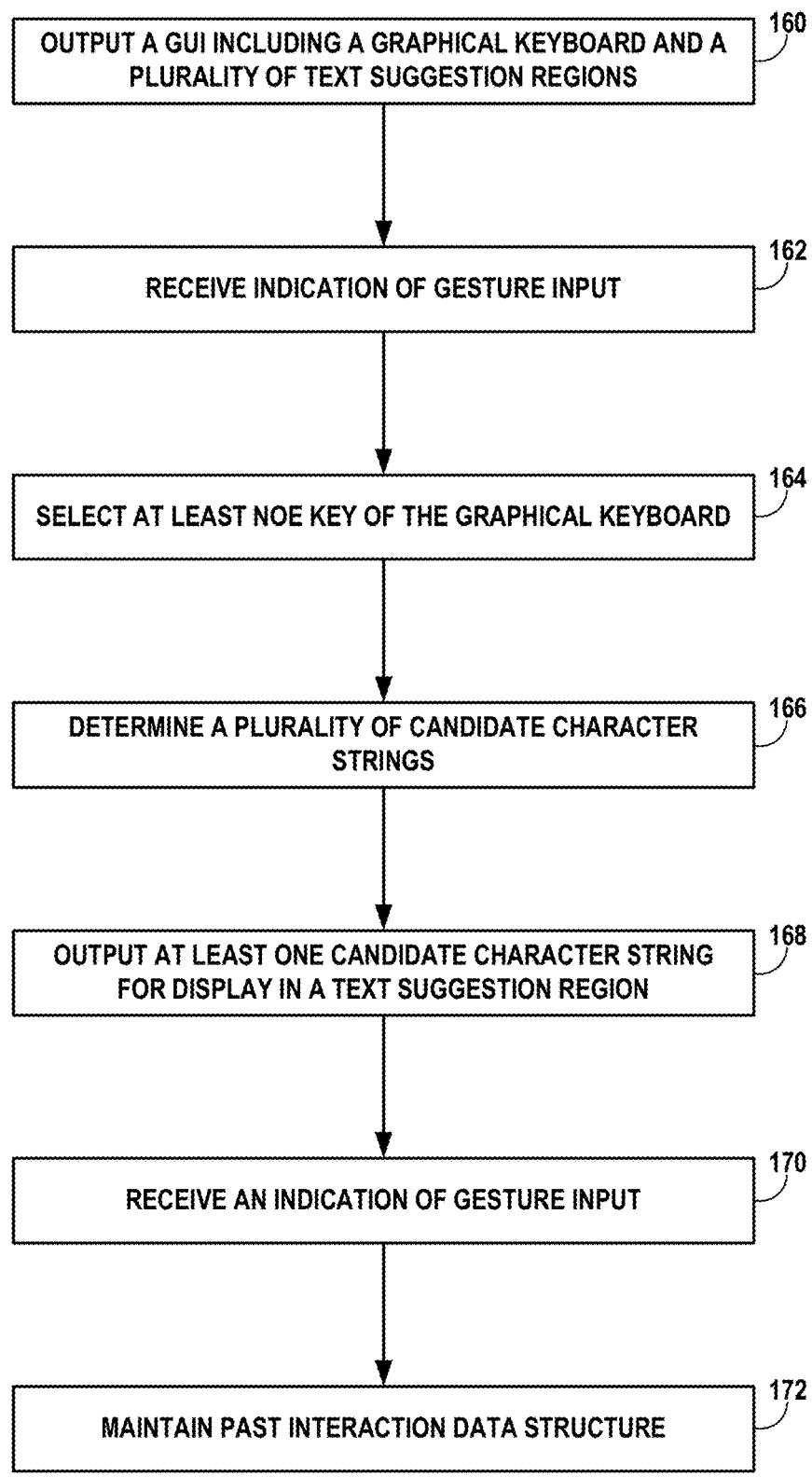
FIG. 4 is a flow diagram illustrating example operations of a computing device that may be used to output at least one candidate character string for display within a text suggestion region of a graphical user interface, in accordance with one or more aspects of this disclosure.

FIG. 4 is a flow diagram illustrating example operations of a computing device that may be used to output at least one candidate character string for display in a text suggestion region of a graphical user interface, in accordance with one or more aspects of this disclosure. For purposes of illustration, the example operations are described below within the context of computing device 2, as shown in FIGS. 1 and 2.

Computing device 2 may output, for display, a graphical user interface including a graphical keyboard and one or more text suggestion regions (160). For example, UI module 6, executing on one or more processors 100 of computing device 2, may output GUI 10A including graphical keyboard 12 and text suggestion regions 16 for display at UI device 4. Computing device 2 may receive an indication of gesture input detected a presence-sensitive input device (162). For instance, computing device 2 may receive an indication of gesture input detected at locations 18 and 20 of UI device 4 (e.g., a presence-sensitive and/or touch-sensitive input device). Computing device 2 may select, based at least in part on the indication of the gesture input, at least one key of the graphical keyboard (164). As an example, UI module 6 may select "T" key 22 based at least in part on the indication of gesture input detected at location 18 of UI device 4. Similarly, UI module 6 may select "H" key 24 based at least in part on the indication of gesture input detected at location 20 of UI device 4.

Computing device 2 may determine, based at least in part on at least one character associated with the at least one key, a plurality of candidate character strings (166). For instance, candidate character string module 114, executing on one or more processors 100 of computing device 2, may determine, based at least in part on at least one of a "T" character associated with "T" key 22 and an "H" character associated with "H" key 24, the plurality of candidate character strings including candidate character string 26 (e.g., the character string "this"), candidate character string 28 (e.g., the character string "the"), candidate character string 30 (e.g., the character string "that"), and candidate character string 32 (e.g., the character string "than").

Computing device 2 may output at least one candidate character string for display in one or more of the text suggestion regions (168). For example, ordering module 118, executing on one or more processors 100 of computing device 2, may output candidate character string 26 for display in text suggestion region 16A, candidate character string 28 for display in text suggestion region 16B, and candidate character string 30 for display in text suggestion region 16C.

Computing device 2 may receive an indication of gesture input detected at a presence-sensitive input device (170). As an example, UI module 6 may receive an indication of gesture input detected at location 23 of UI device 4. Computing device 2 may maintain, in response to receiving the indication of gesture input, past interaction data that includes a representation of a past user decision corresponding to at least one candidate character string of the plurality of candidate character strings while the at least one candidate character string was previously displayed in at least one of the one or more text suggestion regions (172). For example, past interaction module 116 may maintain past interaction data structure 122 to reflect at least one of a user decision to select the candidate character string while the candidate character string is displayed in one of the one or more text suggestion regions, a user decision to ignore the candidate character string while the candidate character string is displayed in one of the one or more text suggestion regions (e.g., continuing to provide gesture input to select one or more keys of graphical keyboard 12 while the candidate character string is displayed within one of the one or more text suggestion regions, and a user decision to reject the candidate character string while the candidate character string is displayed within one of the one or more text suggestion regions.

Figure 5:
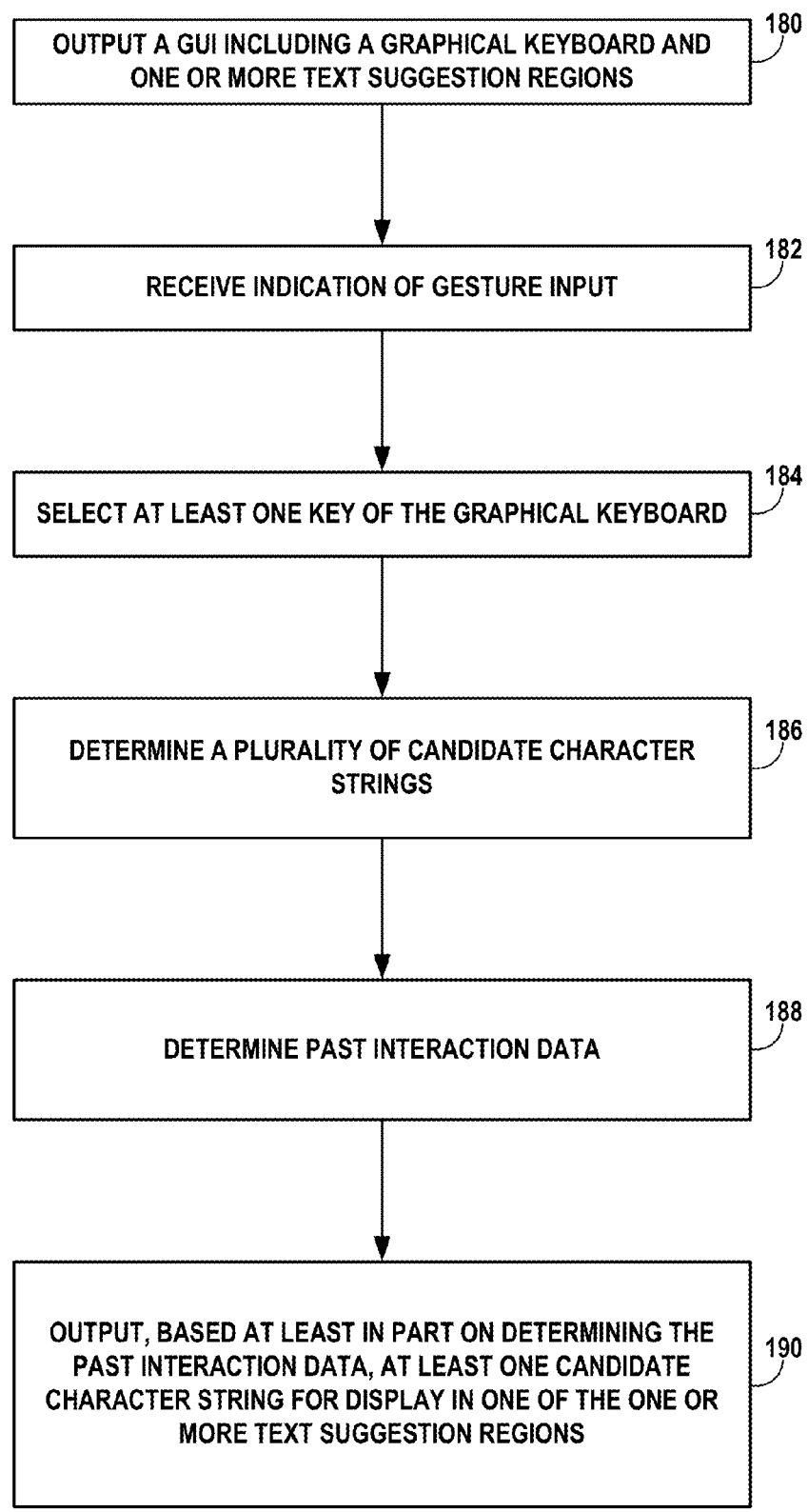
FIG. 5 is a flow diagram illustrating example operations of a computing device that may be user to output at least one candidate character string for display within a text suggestion region of a graphical user interface, in accordance with one or more aspects of this disclosure.

FIG. 5 is a flow diagram illustrating example operations of a computing device that may be user to output at least one candidate character string for display within a text suggestion region of a graphical user interface, in accordance with one or more aspects of this disclosure. For purposes of illustration, the example operations are described below within the context of computing device 2, as shown in FIGS. 1 and 2.

Computing device 2 may output, for display, a graphical user interface including a graphical keyboard and one or more text suggestion regions (180). For example, UI module 6, executing on one or more processors 100 of computing device 2, may output GUI 10A including graphical keyboard 12 and text suggestion regions 16 for display at UI device 4. Computing device 2 may receive an indication of gesture input detected a presence-sensitive input device (182). For instance, computing device 2 may receive an indication of gesture input detected at locations 18 and 20 of UI device 4 (e.g., a presence-sensitive and/or touch-sensitive input device). Computing device 2 may select, based at least in part on the indication of the gesture input, at least one key of the graphical keyboard (184). As an example, UI module 6 may select "T" key 22 based at least in part on the indication of gesture input detected at location 18 of UI device 4. Similarly, UI module 6 may select "H" key 24 based at least in part on the indication of gesture input detected at location 20 of UI device 4.

Computing device 2 may determine, based at least in part on at least one character associated with the at least one key, a plurality of candidate character strings (186). For instance, candidate character string module 114, executing on one or more processors 100 of computing device 2, may determine, based at least in part on at least one of a "T" character associated with "T" key 22 and an "H" character associated with "H" key 24, the plurality of candidate character strings including candidate character string 26 (e.g., the character string "this"), candidate character string 28 (e.g., the character string "the"), candidate character string 30 (e.g., the character string "that"), and candidate character string 32 (e.g., the character string "than").

Computing device 2 may determine past interaction data that includes a representation of a past user input corresponding to at least one candidate character string of the plurality of candidate character strings while the at least one candidate character string was previously displayed in at least one of the one or more text suggestion regions (188). For instance, past interaction module 116, executing on one or more processors 100 of computing device 2, may access (e.g., traverse) past interaction data structure 122 to determine one or more lexical probability weighting factors associated with one or more of the plurality of candidate character strings, such as the plurality of candidate character strings including candidate character strings 26, 28, 30, and 32.

Computing device 2 may output, based at least in part the past interaction data, the at least one candidate character string for display in one of the one or more text suggestion regions (190). For instance, ordering module 118, executing on one or more processors 100 of computing device 2, may access language model 120 to determine a lexical probability of a candidate character string (e.g., a probability that the candidate character string represents a candidate word included in a lexicon). Ordering module 118 may access past interaction data structure 122 to determine a lexical probability weighting factor associated with the candidate character string. The lexical probability weighting factor may reflect a past user input corresponding to the candidate character string while the candidate character string was previously displayed in a text suggestion region. Ordering module 118 may apply the lexical probability weighting factor to the lexical probability to determine a weighted lexical probability associated with the candidate character string. Ordering module 118 may determine, based at least in part on the weighted lexical probability associated with the candidate character string, a ranked ordering of the plurality of candidate character strings. Ordering module 118 may output the at least one candidate character string for display in one of the one or more text suggestion regions based at least in part on the ranked ordering of the plurality of candidate character strings.

In one example, the representation of the past user input corresponding to the at least one candidate character string of the plurality of candidate character strings comprises at least one of: a representation of a past user input to select the at least one candidate character string while the at least one candidate character string was previously displayed in the at least one of the one or more text suggestion regions; a representation of a past user input to ignore the at least one candidate character string while the at least one candidate character string was previously displayed in the at least one of the one or more text suggestion regions; and a representation of a past user input to reject the at least one candidate character string while the at least one candidate character string was previously displayed in the at least one of the one or more text suggestion regions.

In one example, the operations further include determining, by computing device 2, a lexical probability of each respective candidate character string of the plurality of candidate character strings, and determining, by computing device 2 and based at least in part on the lexical probability of each respective candidate character string and on the past interaction data comprising the representation of the past user input corresponding to the at least one candidate character string, a ranked ordering of the plurality of candidate character strings. In such an example, outputting the at least one candidate character string for display in the one of the one or more text suggestion regions comprises outputting, based at least in part on the ranked ordering of the plurality of candidate character strings, the at least one candidate character string for display in the one of the one or more text suggestion regions.

In one example, determining the ranked ordering of the plurality of candidate character strings further comprises: determining, by computing device 2 and based at least in part on the past interaction data, at least one lexical probability weighting factor associated with the at least one candidate character string; applying, by computing device 2, the at least one lexical probability weighting factor to the lexical probability of the at least one candidate character string to determine a weighted lexical probability associated with the at least one candidate character string; and determining, by computing device 2 and based at least in part on the weighted lexical probability associated with the at least one candidate character string, the ranked ordering of the plurality of candidate character strings.

In one example, the one or more text suggestion regions comprises a ranked ordering of the one or more text suggestion regions, the one of the one or more text suggestion regions is associated with a rank within the ranked ordering of the one or more text suggestion regions, and outputting the at least one candidate character string for display in the one of the one or more text suggestion regions further comprises outputting the at least one candidate character string for display in the one of the one or more text suggestion regions based at least in part on determining, by computing device 2, that the at least one candidate character string is associated with a particular rank within the ranked ordering of the plurality of candidate character strings that matches the rank associated with the one of the one or more text suggestion regions.

In one example, receiving the indication of the gesture input comprises receiving an indication of a first gesture input, and the operations further include receiving, by computing device 2, an indication of a second gesture input detected at the presence-sensitive input device, in response to receiving the indication of the second gesture input, selecting, by computing device 2, the at least one candidate character string while the at least one candidate character string is displayed in the one of the one or more text suggestion regions, and in response to selecting the at least one candidate character string while the at least one candidate character string is displayed within the one of the one or more text suggestion regions, maintaining, by computing device 2, the past interaction data to reflect a past user input to select the at least one candidate character string while the at least one candidate character string was previously displayed in the one of the one or more text suggestion regions.

In one example, maintaining the past interaction data comprising the representation of the past user input corresponding to the at least one candidate character string to reflect the past user input to select the at least one candidate character string while the at least one candidate character string was previously displayed within the one of the one or more text suggestion regions comprises maintaining the past interaction data by at least increasing a lexical probability weighting factor associated with the at least one candidate character string.

In one example, receiving the indication of the gesture input comprises receiving an indication of a first gesture input, the at least one key of the graphical keyboard comprises a first key of the graphical keyboard, and the operations further include receiving, by computing device 2, an indication of a second gesture input detected at the presence-sensitive input device, selecting, by computing device 2 and based at least in part on the indication of the second gesture input, a second key of the graphical keyboard, and in response to selecting the second key of the graphical keyboard while the at least one candidate character string is displayed in the one or more text suggestion regions, maintaining, by computing device 2, the past interaction data comprising the representation of the past user input corresponding to reflect a past user input to ignore the at least one candidate character string while the at least one candidate character string was previously displayed in the one of the one or more text suggestion regions.

In one example, maintaining the past interaction data comprising the representation of the past user input corresponding to the at least one candidate character string to reflect the past user input to ignore the at least one candidate character string while the at least one candidate character string was previously displayed in the one of the one or more text suggestion regions comprises maintaining the past interaction data by at least decreasing a lexical probability weighting factor associated with the at least one candidate character string. In one example, maintaining the past interaction data by at least decreasing the lexical probability weighting factor associated with the at least one candidate character string comprises decreasing the lexical probability weighting factor associated with the at least one candidate character string by a first value, and wherein a magnitude of the first value is less than a magnitude of a second value associated with maintaining the past interaction data to reflect a past user input to reject the at least one candidate character string while the at least one candidate character string was previously displayed in the one of the one or more text suggestion regions.

In one example, receiving the indication of the gesture input comprises receiving an indication of a first gesture input, outputting the at least one candidate character string for display in the one of the one or more text suggestion regions comprises outputting a first candidate character string for display in the a first one of the one or more text suggestion regions, and the operations further include outputting, by computing device 2, a second candidate character string for the display in a second one of the one or more text suggestion regions, wherein the second candidate character string is different than the first candidate character string, and wherein the second one of the one or more text suggestion regions is different than the first one of the one or more text suggestion regions, receiving, by computing device 2, an indication of second gesture input detected at the presence-sensitive input device, selecting, by computing device 2 and based at least in part on the indication of the second gesture input, the second candidate character string while the second candidate character string is displayed in the second one of the one or more text suggestion regions, and in response to selecting the second candidate character string while the second candidate character string is displayed in the second one of the one or more text suggestion regions, maintaining, by computing device 2, the past interaction data comprising the representation of the past user input corresponding to the first candidate character string to reflect a past user input to reject the first candidate character string while the first candidate character string was previously displayed in the one of the one or more text suggestion regions.

In one example, maintaining the past interaction data comprising the representation of the past user input corresponding to the first candidate character string to reflect the past user input to reject the first candidate character string while the first candidate character string was previously displayed in the one of the one or more text suggestion regions comprises maintaining the past interaction data by at least decreasing a lexical probability weighting factor associated with the first candidate character string. In one example, maintaining the past interaction data by at least decreasing the lexical probability weighting factor associated with the first candidate character string comprises decreasing the lexical probability weighting factor associated with the first candidate character string by a first value, and wherein a magnitude of the first value is greater than a magnitude of a second value associated with maintaining the past interaction data to reflect a past user input to ignore the first candidate character string while the first candidate character string was previously displayed in the one of the one or more text suggestion regions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
  outputting, by a computing device and for display, a graphical user interface including a graphical keyboard and one or more text suggestion regions, wherein at least one character string is displayed within the one or more text suggestion regions, the at least one character string being associated with a probability;
  receiving, by the computing device, an indication of an initial gesture input detected at a presence-sensitive input device operatively coupled to the computing device;
  maintaining, by the computing device, based on the initial gesture input, past user interaction data to reflect a past decision corresponding to the at least one candidate character string while the at least one candidate character string was previously displayed within the one or more text suggestion regions;
  receiving, by the computing device, an indication of a subsequent gesture input detected at the presence-sensitive input device operatively coupled to the computing device;

determining, by the computing device and based at least in part on the indication of the subsequent gesture input, the at least one candidate character string;

determining, by the computing device and based at least in part on an association between the at least one candidate character string and a context of the subsequent gesture input, a lexical probability for the at least one candidate character string, the lexical probability indicating a probability that the at least one candidate character string represents a word included in a lexicon;

modifying, based at least in part on the past interaction data, the lexical probability; and outputting, by the computing device, for display, based on the lexical probability that was modified based at least in part on the past interaction data, the at least one candidate character string.

2. The method of claim 1, wherein the past interaction data indicates whether: the past decision was to select the at least one candidate character string while the at least one candidate character string was displayed within the one or more text suggestion regions.

3. The method of claim 1, further comprising:

determining, by the computing device and based at least in part on the past interaction data, at least one lexical probability weighting factor associated with the at least one candidate character string;

applying, by the computing device, the at least one lexical probability weighting factor to the lexical probability of the at least one candidate character string to determine a weighted lexical probability associated with the at least one candidate character string; and modifying, by the computing device and based at least in part on the weighted lexical probability associated with the at least one candidate character string, the lexical probability.

4. The method of claim 1, wherein maintaining the past user interaction data comprises:

responsive to determining that the initial gesture input selects the at least one candidate character string while the at least one candidate character string is displayed within the one or more text suggestion regions, maintaining, by the computing device, the past interaction data to reflect that the past decision was to select the at least one candidate character string while the at least one candidate character string was displayed within the one or more text suggestion regions.

5. The method of claim 1, wherein maintaining the past user interaction data comprises:

responsive to determining that the initial gesture input selects a key of the graphical keyboard while the at least one candidate character string is displayed within the one or more text suggestion regions, maintaining, by the computing device, the past interaction data to reflect that the past decision was to ignore the at least one candidate character string while the at least one candidate character string was displayed within the one or more text suggestion regions.

6. The method of claim 1, wherein maintaining the past user interaction data comprises:

responsive to determining that the initial gesture input selects a different character string within the one or more text suggestion regions while the at least one candidate character string is displayed within the one or more text suggestion regions, maintaining, by the computing device, the past interaction data to reflect that a past decision was to reject the at least one candidate character string while the at least one candidate character string was displayed in the one or more text suggestion regions.

7. The method of claim 1, wherein the past interaction data indicates whether the past decision was to ignore the at least one candidate character string while the at least one candidate character string was displayed within the one or more text suggestion regions.

8. The method of claim 1, wherein the past interaction data indicates whether the past decision was to reject the at least one candidate character string while the at least one candidate character string was displayed within the one or more text suggestion regions.

9. A computing device comprising:

at least one processor; and at least one module operable by the at least one processor to:

output, for display, a graphical user interface including a graphical keyboard and one or more text suggestion regions, wherein at least one character string is displayed within the one or more text suggestion regions, the at least one character string being associated with a probability;

receive an indication of an initial gesture input detected at a presence-sensitive input device operatively coupled to the computing device;

maintain, based on the initial gesture input, past user interaction data to reflect a past decision corresponding to the at least one candidate character string while the at least one candidate character string was previously displayed within the one or more text suggestion regions;

receive an indication of a subsequent gesture input detected at the presence-sensitive input device operatively coupled to the computing device;

determine, based at least in part on the indication of the subsequent gesture input, the at least one candidate character string;

determine, based at least in part on an association between the at least one candidate character string and a context of the subsequent gesture input, a lexical probability for the at least one candidate character string, the lexical probability indicating a probability that the at least one candidate character string represents a word included in a lexicon;

modify, based at least in part on the past interaction data, the lexical probability;

output, for display, based on the lexical probability that was modified based at least in part on the past interaction data, the at least one candidate character string.

10. The computing device of claim 9, wherein the past interaction data indicates whether:

the past decision was to select the at least one candidate character string while the at least one candidate character string was displayed at the one or more text suggestion regions the past decision was to ignore the at least one candidate character string while the at least one candidate character string was displayed at the one or more text suggestion regions; and the past decision was to reject the at least one candidate character string while the at least one candidate character string was displayed at the one or more text suggestion regions.

11. The computing device of claim 9, wherein the at least one module is operable by the at least one processor to:

determine, based at least in part on the past interaction data, at least one lexical probability weighting factor associated with the at least one candidate character string;

apply the at least one lexical probability weighting factor to the lexical probability of the at least one candidate character string to determine a weighted lexical probability associated with the at least one candidate character string; and modify, based at least in part on the weighted lexical probability associated with the at least one candidate character string, the lexical probability.

12. The computing device of claim 9, wherein the at least one module is operable by the at least one processor to modify the lexical probability by increasing the lexical probability in response to determining, based on the past user interaction data, that the past decision was to select the at least one candidate character string while the at least one candidate character string was displayed at the one or more text suggestion regions.

13. The computing device of claim 9, wherein the at least one module is operable by the at least one processor to modify the lexical probability by decreasing the lexical probability in response to determining, based on the past user interaction data, that the past decision was to ignore the at least one candidate character string while the at least one candidate character string was displayed at the one or more text suggestion regions.

14. The computing device of claim 9, wherein the at least one module is operable by the at least one processor to modify the lexical probability by decreasing the lexical probability in response to determining, based on the past user interaction data, that the past decision was to reject the at least one candidate character string while the at least one candidate character string was displayed at the one or more text suggestion regions.

15. A non-transitory computer-readable storage medium encoded with instructions that, when executed, cause at least one processor of a computing device to:

output, for display, a graphical user interface including a graphical keyboard and one or more text suggestion regions, wherein at least one character string is displayed within the one or more text suggestion regions, the at least one character string being associated with a probability;

receive an indication of an initial gesture input detected at a presence-sensitive input device operatively coupled to the computing device;

maintain, based on the initial gesture input, past user interaction data to reflect a past decision corresponding to the at least one candidate character string while the at least one candidate character string was previously displayed within the one or more text suggestion regions;

receive an indication of a subsequent gesture input detected at the presence-sensitive input device operatively coupled to the computing device;

determine, based at least in part on the indication of the subsequent gesture input, at least one candidate character string;

determine, based at least in part on an association between the at least one candidate character string and a context of the subsequent gesture input, a lexical probability for the at least one candidate character string, the lexical probability indicating a probability that the at least one candidate character string represents a word included in a lexicon;

modify, based at least in part on past interaction data, the lexical probability;
and output, for display, based on the lexical probability that was modified based at least in part on the past interaction data, the at least one candidate character string.

16. The non-transitory computer-readable storage medium of claim 15, wherein the past interaction data indicates whether the past decision was to ignore the at least one candidate character string while the at least one candidate character string was displayed within the one or more text suggestion regions.

17. The non-transitory computer-readable storage medium of claim 15, wherein the past interaction data indicates whether the past decision was to reject the at least one candidate character string while the at least one candidate character string was displayed within the one or more text suggestion regions.

18. The non-transitory computer-readable storage medium of claim 15, wherein the at least one module is operable by the at least one processor to modify the lexical probability by increasing the lexical probability in response to determining, based on the past user interaction data, that the past decision was to select the at least one candidate character string while the at least one candidate character string was displayed at the one or more text suggestion regions.

* * * * *